United States Patent
Hadav et al.

(10) Patent No.: US 11,726,660 B1
(45) Date of Patent: Aug. 15, 2023

(54) TECHNIQUES FOR FLEXIBLE PHYSICAL DRIVE EXPANSION USING A LOOP BACK CONNECTION

(71) Applicant: Dell Products L.P., Hopkinton, MA (US)

(72) Inventors: Aric Hadav, Tel Aviv (IL); Thomas N. Dibb, Rutland, MA (US); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/721,785

(22) Filed: Apr. 15, 2022

(51) Int. Cl.
*G06F 3/06* (2006.01)
*G06F 13/10* (2006.01)

(52) U.S. Cl.
CPC .......... *G06F 3/0613* (2013.01); *G06F 3/0659* (2013.01); *G06F 3/0673* (2013.01); *G06F 13/102* (2013.01)

(58) Field of Classification Search
CPC ........ G06F 13/38; G01R 31/026; H01R 12/16
See application file for complete search history.

(56) References Cited

U.S. PATENT DOCUMENTS

| | | | |
|---|---|---|---|
| 2007/0081315 A1* | 4/2007 | Mondor | H04Q 1/116 361/788 |
| 2007/0094410 A1* | 4/2007 | Voigt | H04L 43/0811 709/237 |
| 2011/0170551 A1* | 7/2011 | Lund | H04L 45/58 370/401 |
| 2017/0083476 A1* | 3/2017 | Iyer | G06F 8/71 |
| 2019/0056445 A1* | 2/2019 | Duncan | G01R 31/50 |
| 2019/0102335 A1* | 4/2019 | Tan | G06F 13/4221 |

* cited by examiner

*Primary Examiner* — Getente A Yimer
(74) *Attorney, Agent, or Firm* — Muirhead and Saturnelli, LLC

(57) ABSTRACT

Techniques providing connectivity between a CPU and physical storage devices (PDs) can use a loop back path formed between two connectors of an extended PO slot when an extended I/O card is inserted therein. The two connectors can include a first connector having connectivity with the CPU over a first set of lanes, and a second connector having connectivity with the PDs over a second set of lanes. While the extended I/O card is inserted into the I/O slot, connectivity can be provided between the CPU and the PDs using connectivity provided between the CPU and the first connector and the first set of lanes; using the loop back path provided between the first and second connectors; and using connectivity provided between the second connector and the PDs over the second set of lanes.

18 Claims, 10 Drawing Sheets

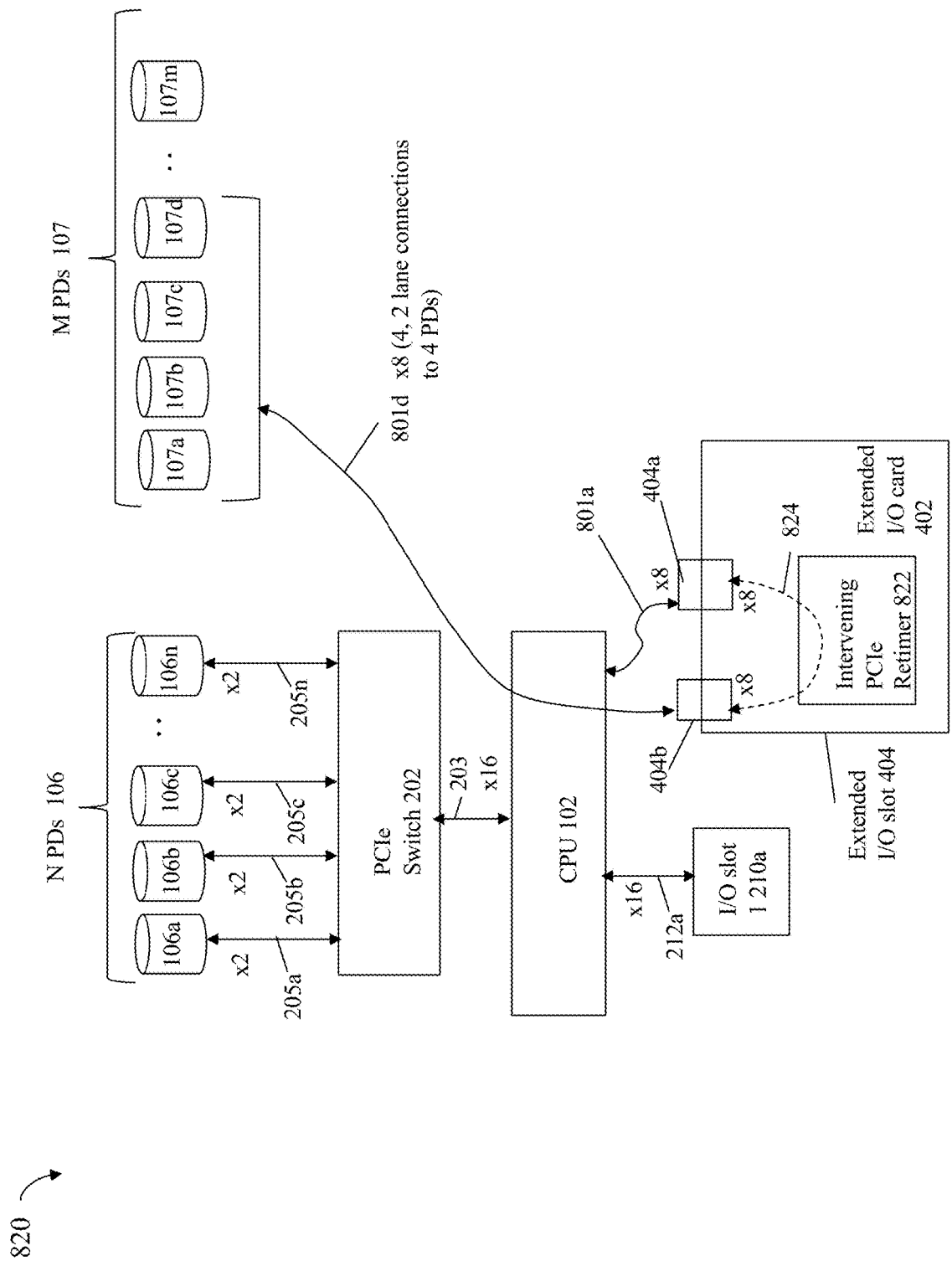

TECHNIQUES FOR FLEXIBLE PHYSICAL DRIVE EXPANSION USING A LOOP BACK CONNECTION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

At least one embodiment of the techniques of the present disclosure can include a system comprising: one or more physical storage devices; a central processing unit (CPU); and an I/O slot including a first connector and a second connector, wherein the first connector is configured to have connectivity with the CPU over a first set of lanes, wherein the second connector is configured to have connectivity with the one or more physical devices over one or more connections configured from a second set of lanes between the second connector and the one or more physical storage devices, wherein the I/O slot is configured to receive an I/O card, and wherein, while the I/O card is inserted into the I/O slot, the I/O card is configured to: have connectivity to the first connector and the second connector, and provide connectivity of a loop back path between the first connector and the second connector; and wherein, while the I/O card is inserted into the I/O slot, the system is configured to: provide connectivity between the CPU and the one or more physical storage devices over the first set of lanes between the CPU and the first connector of the I/O slot, over the loop back path between the first connector and the second connector, and over the second set of lanes between the second connector and the one or more physical storage devices.

In at least one embodiment, the one or more physical storage devices may not have connectivity to the CPU when the I/O card is not inserted into the I/O slot. The one or more connections and the second set of lanes can be provided, at least in part over a cable. The cable can connect the second connector of the I/O slot to a cable connector of an interconnect module, wherein the cable connector of the interconnect module can be configured to have connectivity to the one or more physical storage devices. The one or more connections and the second set of lanes can be provided, at least in part, over one or more electrically conductive pathways of one or more printed circuit boards.

In at least one embodiment, the I/O card can be an extended I/O card, the I/O slot can be an extended I/O slot, and wherein the I/O slot can be further configured to receive a second I/O card different from the I/O card. The second I/O card, when inserted into the I/O slot, can be configured to use the first connector to have connectivity to the CPU over the first set of lanes, can be configured not use the second connector, and can be configured to not have connectivity over the second set of one or more lanes between the I/O slot and the one or more physical storage devices. When the I/O card, which can be the extended I/O card, is inserted into the I/O slot, the I/O card can be configured to use the first connector to provide connectivity with the CPU over the first set of one or more lanes.

In at least one embodiment, the I/O card, which is the extended I/O card, can include one or more components configured to be connectively disposed between the first connector and the second connector of the I/O slot. The one or more components can include an intervening switch configured to be connectively disposed between the first connector and the second connector of the I/O slot. The intervening switch can be configured to have connectivity to the CPU and to the one or more physical storage devices. The intervening switch can have connectivity to the one or more physical storage devices over the second connector and the one or more connections configured from the second set of lanes, and wherein the intervening switch can have connectivity to the CPU over the first connector and the first set of lanes. The intervening switch can be configured to route packets between the second set of lanes and the first set of lanes. X1 can denote a number of lanes in the first set of lanes, X2 can denote a number of lanes in the second set of lanes, and wherein X2 can be more than X1. The one or more components can include an intervening retimer configured to be connectively disposed between the first connector and the second connector of the I/O slot. The intervening retimer can be configured to have connectivity to the CPU and to the one or more physical storage devices, wherein the intervening retimer can have connectivity to the one or more physical storage devices over the second connector and the second one or more connections configured from the second set of lanes, and wherein the intervening retimer can have connectivity to the CPU over the first connector and the first set of lanes. X1 can denote a number of lanes in the first set of lanes, X2 can denote a number of lanes in the second set of lanes, and wherein X2 can equal X1.

In accordance with another aspect of the techniques of the present disclosure, at least one embodiment can include a method for providing connectivity to one or more physical storage devices in a system comprising: providing connectivity between a central processing unit (CPU) and an I/O slot over a first set of lanes connecting the CPU and a first connector of the I/O slot; providing connectivity over a second set of lanes between a second connector of the I/O slot and the one or more physical storage devices; inserting an I/O card into the I/O slot whereby the I/O card has connectivity to the first connector and the second connector of the I/O slot; responsive to said inserting the I/O card into the I/O slot whereby the I/O card has connectivity to the first connector and the second connector of the I/O slot, performing processing including: providing, using the I/O card and the I/O slot, a loop back path between the first connector of the I/O slot and the second connector of the I/O slot; and providing, by the system, connectivity between the CPU and the one or more physical storage devices over the first set of lanes between the CPU and the first connector of the I/O slot, over the loop back path between the first connector and the second connector, and over the second set of lanes between the second connector and the one or more physical storage devices.

In at least one embodiment, the system can be a data storage system including an enclosure, wherein the enclosure includes the CPU, the one or more physical storage devices, and a cable used to provide, at least in part, the second set of lanes between the second connector of the I/O slot and the one or more physical storage devices. The second set of lanes can be configured into one or more connections, wherein each of the one or more connections can include one or more of the second set of lanes, and wherein each of the one or more connections can be a connection to an associated one of the one or more physical storage devices.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 5, 6, 7A, 7B and 7C are examples of components that can be included in various embodiments of a data storage system in accordance with the techniques of the present disclosure.

Figure 1:
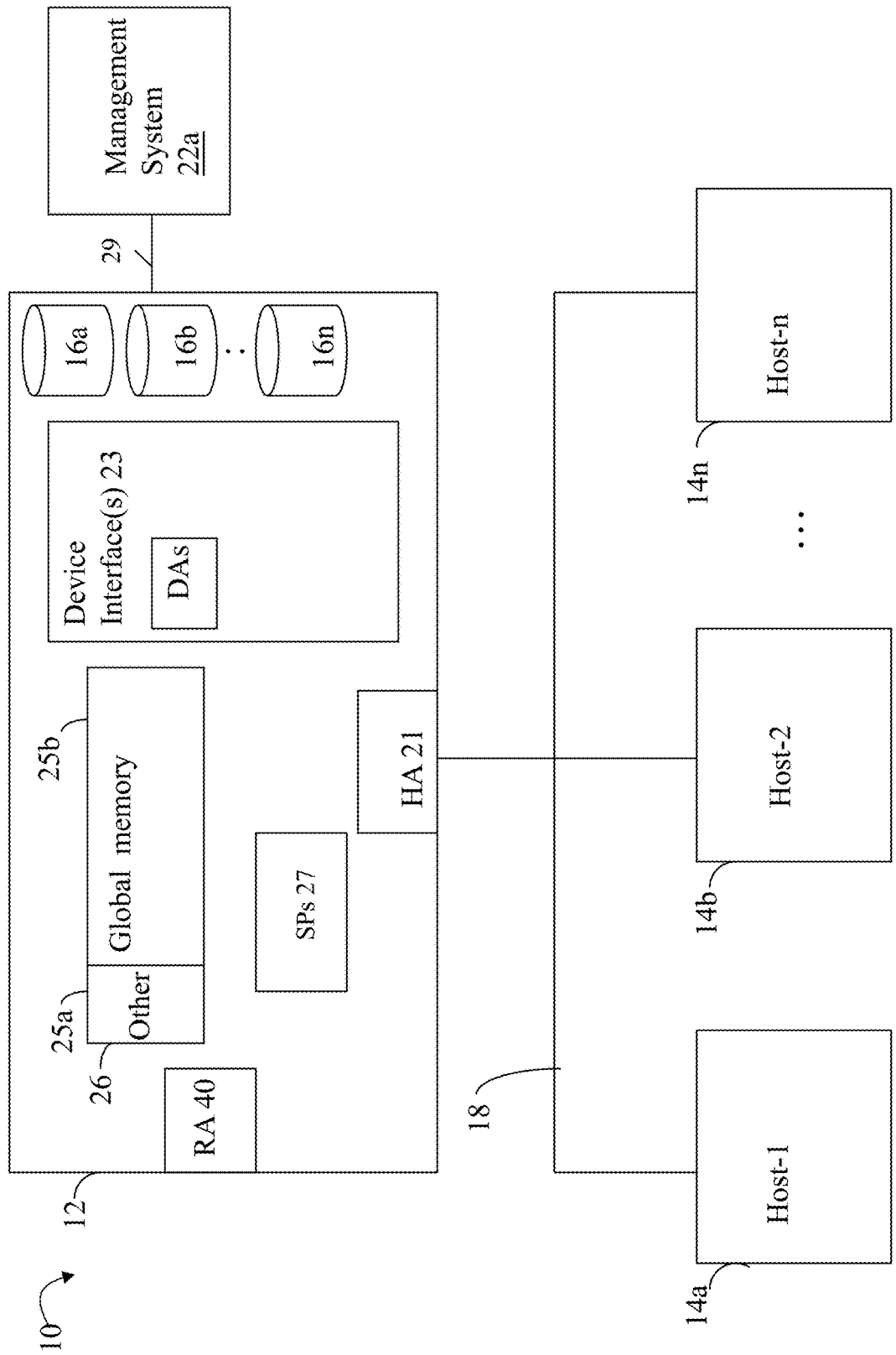
FIG. 1 is an example of components included in a system in accordance with the techniques of the present disclosure.

DETAILED DESCRIPTION OF
EMBODIMENT(S)

Data storage systems include drives or physical data storage devices (PDs) for storing data. The PDs can include non-volatile solid state drives or storage devices (SSDs) used to provide, for example, backend data storage for configured storage objects, such as logical devices or volumes. In some existing systems, PDs, such as those of a data storage system, can be housed in a drive enclosure chassis (sometimes referred to simply as a chassis) or disk array enclosure (DAE). With the advancement of modern storage and drive technology of PDs such as non-volatile SSDs, PDs used in a data storage system have become smaller in physical size and dimensions due to the ability to more densely store larger amounts of data. With the smaller physical size of the modern PDs, a system can generally accommodate a larger number of PDs in the same physical space of the DAE as compared to older, larger PDs. For example, with the EDSFF (Enterprise and Data Center Standard Form Factor) PDs, such as the E1 or E3 SSD form factor drives, a standard size DAE can accommodate up to MAX1, a first maximum number of EDSFF PDs in a single row as compared to, for example, MAX2, a second maximum of the larger U.2 SSD form factor drives, where MAX1 can be generally larger than MAX2.

Thus, in a system using a larger number of the smaller sized PDs, such as the EDSFF PDs, as compared to using a smaller number of the larger sized PDs, such as the U.2 form factor PDs, additional connections or resources are needed, for example, to connect from a CPU (central processing unit) of the system to the newer much more data storage dense EDSFF PDs. For example, in a case where MAX1 is about twice MAX2, the drive connectivity (electrical connectivity) requirements such as connections between the CPU and the PDs can be double in a system that scales up from the lesser quantity of MAX2 U.2 form factor PDs to an upgraded configuration including the greater number of MAX1 newer, smaller EDSFF PDs.

A data storage system can be configured to communicate with the SSDs using NVMe (nonvolatile memory express), where NVMe can be characterized as a storage access and transport protocol for flash and next-generation SSDs. Additionally, the data storage system can be configured to have an internal fabric that operates in accordance with the PCIe (Peripheral Component Interconnect Express) protocol. In such a data storage system using NVMe and PCIe, one option for a connectivity model or topology from a CPU of the data storage system to the PDs can be a direct connectivity model or topology with PCIe connections directly from the CPU to PDs. However, in instances such as noted above where the system is increasing the number of PDs from the lesser quantity of MAX2 larger U.2 form factor PDs to an upgraded configuration including a larger quantity of MAX1 newer, smaller EDSFF PDs, where MAX1=2*MAX2, such an increase in the number of PDs will require MAX1 PCIe connections. In existing systems, each PD port can require at least ×2 or 2 PCIe lanes so that, for example, at least 2*MAX1 PCIe lanes from the CPU are needed for such a direct connectivity model with MAX1 PDs. Such a direct connectivity model with the larger number of PDs can be impractical since an insufficient number of CPU PCIe lanes can remain for other system requirements and uses, for example, such as for I/O cards, CPU cards, accelerator cards, and the like.

When a system has limited PCIe lane resources such as the above-noted case with the direct connectivity model from the CPU to the PDs, an intervening PCIe switch can be used and configured between the CPU and the PDs. Use of the PCIe switch can be characterized in one aspect as an indirect connectivity model between the CPU and the PDs. For example, assume that there are 16 PCIe lanes allocated for use in communication between the CPU and the PDs. Although 16 PCIe lanes are noted for illustration, more generally, the number of PCIe lanes can be any suitable number of lanes that can provide sufficient bandwidth to the PDs. With the indirect connectivity model, the PCIe switch can be connected from one side to 16 up-stream PCIe lanes of the CPU, and the other side of the PCIe switch can fan out to as many down-stream PCIe lanes and connections that are required based on the number of PDs in the system. The indirect connectivity model or topology with an intervening switch between the CPU and the PDs can be configured and used in connection with any suitable protocols, where the switch is connected at one side to the CPU and on another side, the switch can fan out with connections to the PDs.

With the indirect connectivity model, as the number of PDs increases such as in cases noted above when increasing the number of PDs in the system from the lesser quantity MAX2 of the larger U.2 form factor PDs to an upgraded configuration including a larger number MAX1 of the newer, smaller EDSFF PDs, larger more expensive switches are needed with the number of required fan out connections to the required MAX1 number of PDs. Additionally, the number of PDs in a system can yet further increase over time so that the number of required switch fan out connections to the PDs can also further increase at one or more subsequent points in time.

Thus the indirect connectivity model can have drawbacks in that generally as the number PDs in the system increases, larger switches are needed with the additional fanout connections to the PDs. Such larger switches result in increased monetary costs. Additionally, a larger switch consumes more space in the chassis design. For example, as the size of the switch increases, additional space on PCBs (printed circuit boards) including the switch can result in undesirable cost increases. Even though an initial system configuration may include a lesser number of PDs, a system can be initially configured with the larger, more expensive switch in order to accommodate the potential future expansion from the lesser number of PDs to a larger maximum number of PDs resulting in increased costs. Alternatively, the initial system configuration can include a smaller switch capable of connectivity to the lesser number of PDs but not the larger maximum number of PDs. A subsequent system upgrade to the larger maximum number of PDs can be more complex and costly, for example, requiring complex CPU node replacement to configure the larger switch and/or adding an additional external DAE with the additional PDs.

To further illustrate existing drawbacks, at least one existing data storage system can be predefined and initially configured to support a maximum number of PDs. Generally, the maximum number of PDs supported in a system can be due to several factors. For example, the factors limiting or restricting the maximum number of PDs can include the number of PDs supported by the midplane, the mechanical chassis design (e.g., the physical space within the chassis for the PDs), the number of downstream PCIe lanes that fan out from the PCIe switch, and the like. If one wishes to increase the number of PDs supported, then a simple, yet expensive approach is to add an additional external DAE including additional PDs, or replace the entire chassis if there is a chassis or mid-plane limitation. In cases where the chassis mechanical design and mid-plane are provisioned for a higher number of PDs, and the limiting factor is the number of PCIe lanes going to the PDs, then one existing solution is to replace the interconnect circuitry to enlarge the switch used and increase the number of fan out connections from the switch to the PDs. In some instances, upgrading from the smaller to the larger switch can require replacement of an entire CPU node or board that includes the switch, CPU and other components and circuitry thereby resulting in expensive replacement costs.

In at least one existing system, the chassis and mid-plane may support a large number of PDs such as, for example, MAX1 EDSFF PDs, but for cost and placement reasons, a smaller PCIe switch can be used which may not be capable of providing connectivity from the PCIe switch to the MAX1 EDSFF PDs. In such an existing system having the smaller PCIe switch, the upgrade to the larger quantity of MAX1 PDs can be done by replacing the entire existing CPU node with a new CPU node having the required larger PCIe switch with the required connectivity needed for up to possibly MAX1 PDs thereby resulting in expensive replacement costs as noted above.

Described in the following paragraphs are techniques that can be used in an embodiment to overcome the above-noted drawbacks. The techniques of the present disclosure can be used to provide a flexible solution to customers for expanding or increasing the number of PDs in a system. The techniques of the present disclosure can be used to provide an initial configuration of a system which can include an initial number of PDs which can be expanded and increased to a larger number of PDs over time. The techniques of the present disclosure provide such flexibility in upgrades and varying the number of PDs to meet changing and varying storage capacity needs of different customers while also seeking to reduce the associated overall cost without the need for a large and complex CPU node replacement and/or without requiring the addition of an external DAE to increase the number of PDs in the system.

In at least one embodiment, the techniques of the present disclosure can be used in a data storage system when increasing or adding additional PDs to the data storage system. The techniques of the present disclosure can be used to provide connectivity between the CPU and the additional PDs in a cost effective and flexible manner. In at least one embodiment, the additional PDs can be included in the same chassis or DAE as other existing PDs currently having connectivity to the CPU. At the start, the additional PDs may have no connectivity to the CPU and can be physically housed and inserted into the same chassis or system as the existing PDs. There may be, for example, insufficient lane resources of the CPU and/or PCIe switch to provide connectivity between the CPU and the new additional PDs. In such an embodiment, connectivity between the CPU and the additional PDs can be provided using a loop back connection or path configured between two connection points of an I/O slot. In at least one embodiment, the I/O slot can be an extended I/O slot including two connectors which are configured to provide the loop back connectivity when a special extended I/O card is inserted into the extended I/O slot. The extended I/O slot can be configured to receive both the extended I/O card as well as a non-extended (e.g., standard or regular) I/O card. The two connectors of the extended I/O slot can include a standard connector and an additional reserved or dedicated connector. The standard connector can be used for connectivity by both the extended I/O card and the non-extended I/O card when either is inserted into the extended I/O slot. However, in at least one embodiment, the additional reserved or dedicated connector can be used for connectivity only by the extended I/O card when inserted into the extended I/O slot. In at least one embodiment, the extended I/O card can be designed and configured to receive up stream lanes from the CPU over the standard connector. The extended I/O card can be designed and configured to provide a loop back connection between the standard connector, and thus the up stream lanes from the CPU, and the additional connector, which has connectivity to the additional PDs. In this manner, inserting the extended I/O card into the extended I/O slot can generally provide connectivity between the CPU and the one or more additional PDs using a loop back connection between the standard connector and the additional (e.g., reserved or dedicated) connector of the extended I/O slot.

In at least one embodiment, the connectivity between the additional connector of the extended I/O slot and the additional PDs can be provided using one or more means including, for example, a cable and/or embedded conductive pathways such as in one or more PCBs. In at least one embodiment, the cable can be internally housed in the same chassis or enclosure as the existing PDs, the additional PDs, the extended I/O slot, the CPU (e.g., where the existing PDs have connectivity to the CPU, and where connectivity is configured and established between the additional PDs and the CPU using the cable), and other components. The cable can be used, for example, in instances where the internal configuration and arrangement of components within the chassis may not allow for only using embedded conductive pathways such as in one or more PCBs.

In at least one embodiment, the overall connectivity or path between the CPU and the one or more additional PDs can include: a first connection between the CPU and the standard connector of the extended I/O slot, a second connection that is the loop back connection between the standard connector and the additional connector of the extended I/O slot, and a third connection between the additional connector of the extended I/O slot and the one or more additional PDs. In at least one embodiment, the loop back connection can be configured and established or provided by the extended I/O card when the extended I/O card is inserted into the extended I/O slot. The third connection can more generally be characterized as connectivity between the extended I/O slot and the one or more additional PDs, where such connectivity can include multiple PCIe lanes which can be further partitioned and configured into multiple paths to multiple additional PDs. In at least one embodiment, the third connection can be configured and provided or established using one or more other connections and associated means and techniques. For example, in at least one embodiment, the third connection can be configured and established using means including A) a cable connected between the additional connector of the extended I/O slot and a cable connector of an interconnect module, where the interconnect module can be a PCB; and B) conductive pathways between the cable connector of the interconnect module and one or more other midplane connectors having connectivity to the one or more additional PDs. The conductive pathways of B) can be, for example, embedded in the interconnection module PCB. In at least one embodiment, the one or more additional PDs can also plug into the midplane using the one or more other midplane connectors. Generally, the midplane can provide connectivity between components having connectivity to the midplane via midplane connectors. In at least one embodiment, a CPU node or module can include the CPU, the extended I/O slot including the standard and additional reserved connectors, the interconnect PCB module, and the cable connector of the interconnect module. The CPU node and the one or more additional PDs can plug into the midplane using midplane connectors. In at least one system due to the configuration and arrangement of components of the CPU node or module, not all components of the CPU node can have connectivity to the midplane despite the interconnect module of the CPU node plugging into the midplane via midplane connectors. For example, the extended I/O slot may not have connectivity to the midplane as a result of the CPU node plugging into the midplane. In this case in such an embodiment, providing connectivity using a different path or connection (e.g., such as using the cable and/or conductive pathways) between a component such as the extended I/O slot and the midplane provides connectivity between the extended I/O slot and the one or more additional PDs plugged into the midplane.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of physical drives or data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
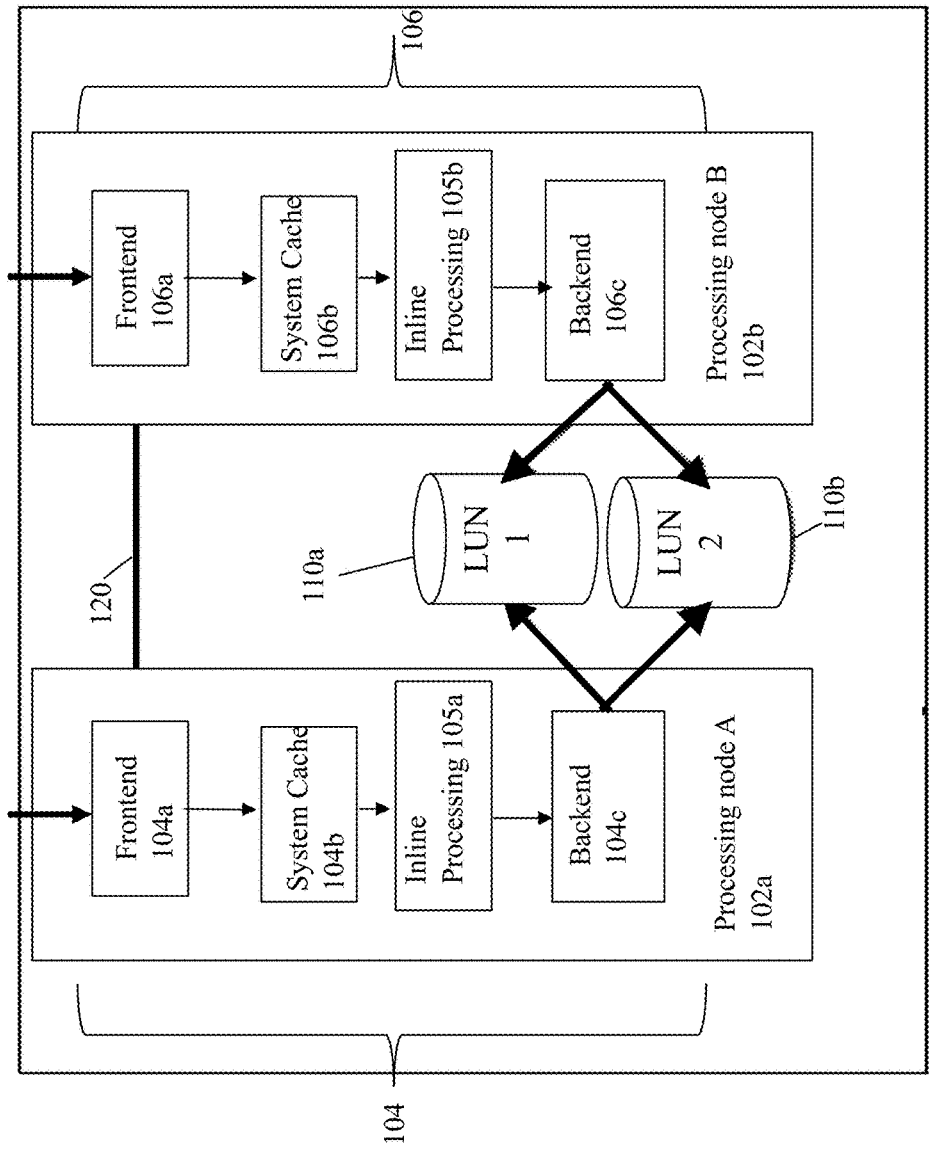
FIG. 2 is an example illustrating the PO path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with discussion above, data storage systems include PDs for storing data. The PDs can include non-volatile SSDs used to provide, for example, backend data storage for configured storage objects, such as logical devices or volumes. In some existing systems, PDs, such as those of a data storage system, can be housed in a drive enclosure chassis (sometimes referred to simply as a chassis) or DAE With the advancement of modern storage and drive technology of PDs such as non-volatile SSDs, PDs used in a data storage system have become smaller in physical size and dimensions due to the ability to more densely store larger amounts of data. With the smaller physical size of the modern PDs, a system can generally accommodate a larger number of PDs in the same physical space of the DAE as compared to older, larger PDs. For example, with the EDSFF (Enterprise and Data Center Standard Form Factor) PDs, such as the E1 or E3 SSD form factor drives, a standard size DAE can accommodate up to MAX1, a first maximum number of EDSFF PDs in a single row as compared to, for example, MAX2, a second maximum of the larger U.2 SSD form factor drives, where MAX1 can be generally larger than MAX2.

Thus, in a system using a larger number of the smaller sized PDs, such as the EDSFF PDs, as compared to using a smaller number of the larger sized PDs, such as the U.2 form factor PDs, additional connections or resources are needed, for example, to connect from a CPU (central processing unit) of the system to the newer much more data storage dense EDSFF PDs. For example, in a case where MAX1 is about twice MAX2, the drive connectivity requirements such as connections between the CPU and the PDs can be double in a system that scales up from the lesser quantity of MAX2 U.2 form factor PDs to an upgraded configuration including the greater number of MAX1 newer, smaller EDSFF PDs.

A data storage system can be configured to communicate with the SSDs using NVMe (nonvolatile memory express), where NVMe can be characterized as a storage access and transport protocol for flash and next-generation SSDs. Additionally, the data storage system can be configured to have an internal fabric that operates in accordance with the PCIe (Peripheral Component Interconnect Express) protocol. In such a data storage system using NVMe and PCIe, one option for a connectivity model or topology from a CPU of the data storage system to the PDs can be a direct connectivity model or topology with PCIe connections directly from the CPU to PDs. However, in instances such as noted above where the system is increasing the number of PDs from the lesser quantity of MAX2 larger U.2 form factor PDs to an upgraded configuration including a larger quantity of MAX1 newer, smaller EDSFF PDs, where MAX1=2*MAX2, such an increase in the number of PDs will require MAX1 PCIe connections. In existing systems, each PD port can require at least ×2 or 2 PCIe lanes so that, for example, at least 2*MAX1 PCIe lanes from the CPU are needed for such a direct connectivity model with MAX1 PDs. Such a direct connectivity model with the larger number of PDs can be impractical since an insufficient number of CPU PCIe lanes can remain for other system requirements and uses, for example, such as for I/O cards, CPU cards, accelerator cards, and the like.

When a system has limited PCIe lane resources such as the above-noted case with the direct connectivity model from the CPU to the PDs, an intervening PCIe switch can be used and configured between the CPU and the PDs. Use of the PCIe switch can be characterized in one aspect as an indirect connectivity model between the CPU and the PDs. For example, assume that there are 16 PCIe lanes allocated for use in communication between the CPU and the PDs. Although 16 PCIe lanes are noted for illustration, more generally, the number of PCIe lanes can be any suitable number of lanes that can provide sufficient bandwidth to the PDs. With the indirect connectivity model, the PCIe switch can be connected from one side to 16 up-stream PCIe lanes of the CPU, and the other side of the PCIe switch can fan out to as many down-stream PCIe lanes and connections that are required based on the number of PDs in the system. More generally, the indirect connectivity model or topology with an intervening switch between the CPU and the PDs can be configured and used in connection with any suitable protocols, where the switch is connected at one side to the CPU and on another side, the switch can fan out with connections to the PDs.

With the indirect connectivity model, as the number of PDs increases such as in cases noted above when increasing the number of PDs in the system from the lesser quantity MAX2 of the larger U.2 form factor PDs to an upgraded configuration including a larger number MAX1 of the newer, smaller EDSFF PDs, larger more expensive switches are needed with the number of required fan out connections to the required MAX1 number of PDs. Additionally, the number of PDs in a system can yet further increase over time so that the number of required switch fan out connections to the PDs can also further increase at one or more subsequent points in time.

Thus the indirect connectivity model can have drawbacks in that generally as the number PDs in the system increases, larger switches are needed with the additional fanout connections to the PDs. Such larger switches result in increased monetary costs. Additionally, a larger switch consumes more space in the chassis design. For example, as the size of the switch increases, additional space on PCBs (printed circuit boards) including the switch can result in undesirable cost increases. Even though an initial system configuration may include a lesser number of PDs, a system can be initially configured with the larger, more expensive switch in order to accommodate the potential future expansion from the lesser number of PDs to a larger maximum number of PDs resulting in increased costs. Alternatively, the initial system configuration can include a smaller switch capable of connectivity to the lesser number of PDs but not the larger maximum number of PDs. A subsequent system upgrade to the larger maximum number of PDs can be more complex and costly, for example, requiring complex CPU node replacement to configure the larger switch and/or adding an additional external DAE with the additional PDs.

To further illustrate existing drawbacks, at least one existing data storage system can be predefined and initially configured to support a maximum number of PDs. Generally, the maximum number of PDs supported in a system can be due to several factors. For example, the factors limiting or restricting the maximum number of PDs can include the number of PDs supported by the midplane, the mechanical chassis design (e.g., the physical space within the chassis for the PDs), the number of downstream PCIe lanes that fan out from the PCIe switch, and the like. If one wishes to increase the number of PDs supported, then a simple, yet expensive approach is to add an additional external DAE including additional PDs, or replace the entire chassis if there is a chassis or mid-plane limitation. In cases where the chassis mechanical design and mid-plane are provisioned for a higher number of PDs, and the limiting factor is the number of PCIe lanes going to the PDs, then one existing solution is to replace the interconnect circuitry to enlarge the switch used and increase the number of fan out connections from the switch to the PDs. In some instances, upgrading from the smaller to the larger switch can require replacement of an entire CPU node or board that includes the switch, CPU and other components and circuitry thereby resulting in expensive replacement costs.

In at least one existing system, the chassis and mid-plane may support a large number of PDs such as, for example, MAX1 EDSFF PDs, but for cost and placement reasons, a smaller PCIe switch can be used which may not be capable of providing connectivity from the PCIe switch to the MAX1 EDSFF PDs. In such an existing system having the smaller PCIe switch, the upgrade to the larger quantity of MAX1 PDs can be done by replacing the entire existing CPU node with a new CPU node having the required larger PCIe switch with the required connectivity needed for up to possibly MAX1 PDs thereby resulting in expensive replacement costs as noted above.

Described in the following paragraphs are techniques that can be used in an embodiment to overcome the above-noted drawbacks. The techniques of the present disclosure can be used to provide a flexible solution to customers with varying numbers of PDs. The techniques of the present disclosure can be used to provide an initial configuration of a system which can include an initial number of PDs which can be expanded and increased to a larger number of PDs over time. The techniques of the present disclosure provide such flexibility in upgrades and varying the number of PDs to meet changing and varying storage capacity needs of different customers while also seeking to reduce the associated overall cost without the need for a large and complex node replacement and/or without requiring the addition of an external DAE to increase the number of PDs in the system.

In at least one embodiment of the techniques of the present disclosure, connectivity between the CPU and the additional PDs added to a system can be established over a path using one of the I/O slots when an I/O card is inserted into the I/O slot. When the I/O card is inserted into the I/O slot, a loop back path or connection can be provided. The upstream connectivity from the CPU to the I/O slot can be redirected downstream to the unconnected additional PDs using the loop back path from a first connector of the I/O slot to a second connector of the I/O slot. The first connector of the I/O slot can be connected to the CPU by upstream PCIe lanes which, when the I/O card is inserted in the I/O slot, are routed or looped back to the second connector of the I/O slot. The second connector of the I/O slot can have connectivity to the additional PDs. A cable can be used to establish connectivity between the second connector of the I/O slot and an interconnect module, where the interconnect module has connectivity to the additional PDs.

In at least one embodiment, the I/O slot can be characterized as an extended I/O slot which is designed and configured to receive an extended I/O card and also a regular, standard or non-extended I/O card. In such an embodiment, only one of the extended or non-extended I/O cards can be inserted into the extended I/O slot at a point in time. While the extended I/O card is inserted into the extended I/O slot, the extended I/O card can establish connectivity to the additional PDs using an additional connector of the extended I/O slot. When the non-extended I/O card rather than the extended I/O card is inserted into the extended I/O slot, the additional connector can remain unused. In such an embodiment, using the extended I/O slot with the additional connector may not interfere with original functionality of the I/O slot as provided using one or more other connectors of the extended I/O slot when the non-extended I/O card is inserted. In at least one embodiment, inserting the extended I/O card into the extended I/O slot can establish connectivity to the additional PDs using the additional connector as well as providing the extended I/O card with connectivity to the CPU using the one or more other connectors. In at least one embodiment, inserting the non-extended I/O card into the extended I/O slot can establish connectivity to the CPU using upstream lanes of the one or more other connectors to the CPU but not establish connectivity to the additional connector. Thus, for example, the standard I/O card can be inserted into the extended I/O slot at a first point in time. At a second point in time subsequent to the first point in time, the same extended I/O slot can be used with the techniques of the present disclosure by inserting the extended I/O card into the extended I/O slot thereby replacing the standard I/O card with the extended I/O card. In a similar manner, for example, at a third point in time subsequent to the second point in time, the standard I/O card can be reinserted into the extended I/O slot thereby replacing the extended I/O card with the standard I/O card. In at least one embodiment, the additional connector of the extended I/O slot can be a dedicated or reserved connector configured for use with only the extended I/O card and not with other non-extended I/O cards. In at least one embodiment, the one or more other connectors of the extended I/O slot can be standard, normal or regular connectors configured for use with both the non-extended and the extended I/O cards. However in at least one embodiment, when the extended I/O card is inserted into the extended I/O slot, at least one of the one or more other connectors (e.g., standard or regular connectors of the extended I/O slot) can be used to provide a loop back connection with the additional connector (e.g., reserved or dedicated connector of the extended I/O slot).

When the extended I/O card is inserted into the extended I/O slot, connectivity can be established between the CPU and the additional PDs using a first set of PCIe lanes between the CPU and a standard connector of the extended I/O slot (e.g., where the standard connector can be used by both the extended and non-extended I/O cards when inserted into the extended I/O slot), and using a second set of PCIe lanes between the additional connector of the extended I/O slot and the additional PDs. In at least one embodiment, connectivity between the additional connector and the additional PDs using the second set of PCIe lanes can be established, at least in part, using a cable. The cable can connect the additional connector of the extended I/O slot to an interconnect module, where the interconnect module has further connectivity to the additional PDs. In at least one embodiment, connectivity between the additional connector and the additional PDs using the second set of PCIe lanes can be established, at least in part, using one or more electrically conductive pathways such of a PCB. In at least one embodiment, connectivity between the additional connector and the additional PDs using the second set of PCIe lanes can be established, at least in part, using both the cable and one or more electrically conductive pathways of a PCB. The second set of PCIe lanes can be further partitioned and configured into multiple connections to multiple additional PDs.

In at least one embodiment, one or more intervening components can be configured on the extended I/O card. The one or more intervening components can be connectively disposed between the two connectors or connection points (e.g., the additional dedicated connector and one standard connector) of the extended I/O card providing the loop back path connectivity of the extended I/O card when the extended I/O card is inserted into the extended I/O slot. In at least one embodiment, the one or more intervening components can include an intervening switch, such as a PCIe switch, and/or a retimer, such as a PCIe retimer.

Retimers, such as PCIe retimers, are known in the art can be used to support signal expansion over CPU boards, backplanes or midplanes, cables, add-in cards, and the like. A PCIe Retimer can be implemented as an integrated circuit which can be included on a PCB, for example, of the extended I/O card. The retimer can be used, for example, when a signal or transmission has to pass through multiple components such as, for example, a connector to a cable or to another PCB and then to another PCB (i.e. mid-plane or back-plane layouts). Discontinuities can result in the transmitted signal due to the multiple components which the signal passes through. As a result, an endpoint can receive the transmitted signal which can be weak, noisy and/or erroneous. To address the foregoing potential discontinuities in the signal transmitted and maintain signal integrity, a retimer can be used which generally takes as an input a signal and outputs a regenerated signal for retransmission, where the regenerated signal includes a fresh recovered copy of the data in a strengthened or boosted signal with any errors, noise, and the like, removed. Whether an intervening component is needed can vary with the particular configuration. For example, whether a retimer is needed can depend on the signal integrity, the distance the signal is transmitted, the components the signal passes through, and the like. Whether an intervening PCIe switch is needed can depend, for example, on X1 denoting a first number of lanes connecting the CPU and the extended I/O slot, and X2 denoting a second number of lanes needed for connections to the additional PDs. In cases where X2 is larger than X1, the intervening PCIe switch can be used to generally expand connectivity to the CPU and route packets between the X2 second number of downstream lanes to the additional PDs and the X1 number of upstream lanes to the CPU.

In at least one embodiment, the intervening component can be an intervening switch used to route packets between one or more of the additional PDs and the CPU. In at least one embodiment, the intervening switch can be included in the extended I/O card such that the additional PDs are configured to communicate (e.g., have connectivity) over multiple lanes to the intervening switch when the extended I/O card is inserted into the extended I/O slot. Each of the additional PDs can have connectivity to the intervening switch over an associated connection including one or more of the multiple lanes. The intervening switch can be configured to route packets between the one or more of the associated downstream connections to the one of more of the additional PDs and the upstream connection to the CPU to establish communications between the one or more of the additional PDs and the CPU over the upstream connection and over the one or more associated connections of the additional PD(s). The one or more associated connections between the intervening switch of the extended I/O slot and the one or more additional PDs can be established, for example, using the cable and/or one or more electrically conductive paths of one or more PCBs as described above.

The foregoing and other aspects of the techniques of the present disclosure are described in more detail in the following paragraphs.

Before proceeding to solutions and discussion of embodiments of the techniques of the present disclosure, reference is made to the example 200 of FIG. 3 to first illustrate an example of components that can be included in a data storage system in which the techniques of the present disclosure can be subsequently applied to provide connectivity between a CPU and M additional PDs currently having no connectivity to the CPU.

Figure 3:
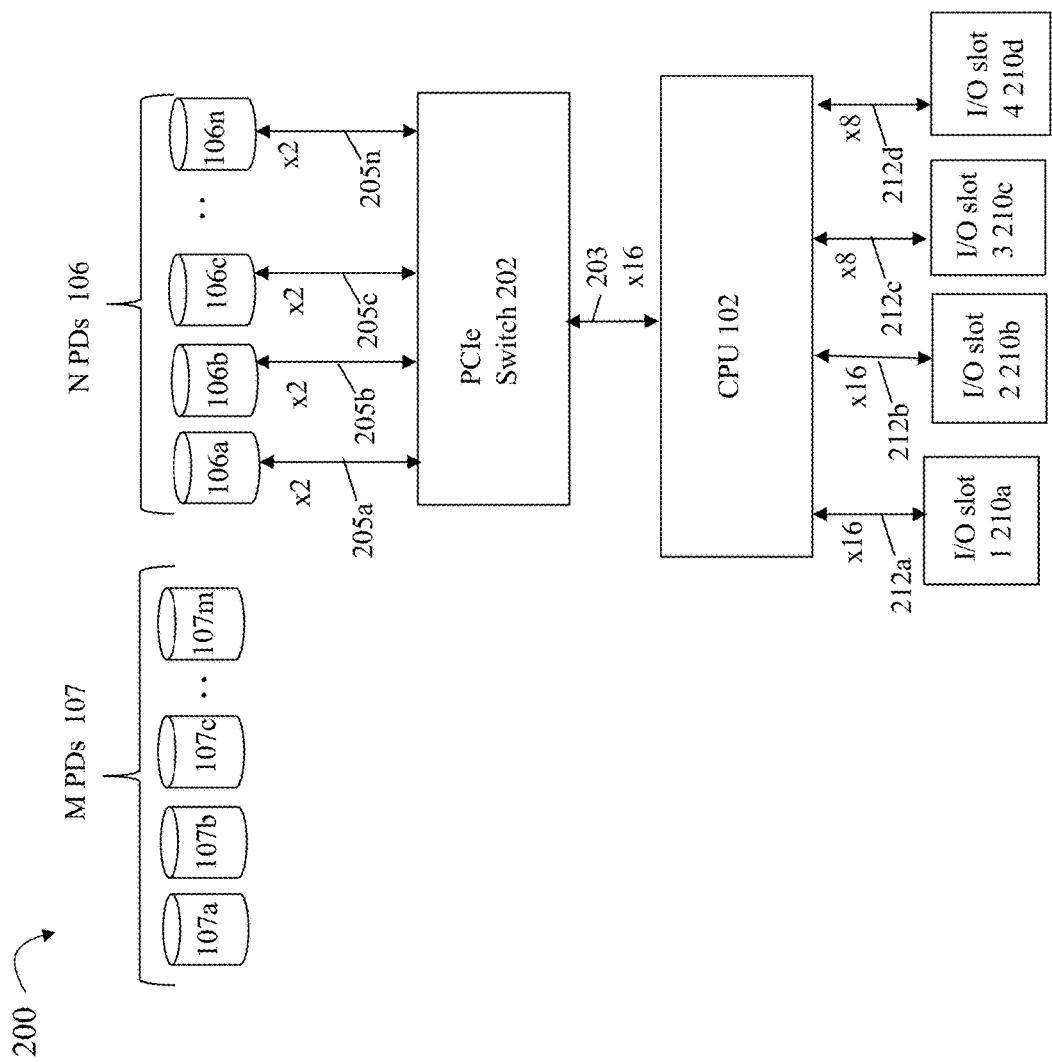
FIGS. 3, 4A and 4B are examples of components of an embodiment of a data storage system.

In particular, FIG. 3 provides further detail regarding components that can be included in an embodiment of the data storage system 12. Other components of the data storage system have been omitted from FIG. 3 for simplicity of illustration. Additionally for simplicity of illustration the CPU 102 can denote a single CPU node connected to the PDs 106 although more generally, the data storage system can include multiple CPU nodes such as, for example, 2 CPU or processing nodes as illustrated in FIG. 2.

The example 200 includes N PDs 106 denoting N PDs providing, for example, backend (BE) non-volatile storage to the data storage system. The N PDs 106 are connected, respectively, by the connections 205a-n to the PCIe switch 202. The PCIe switch 202 is connected by the connection 203 to the CPU 102. Additionally, the I/O slots 212a-d are connected, respectively, by the connections 212a-d to the CPU 102. Also illustrated are M PDs 107 that can be unconnected or disconnected from the PCIe switch 202, and more generally, not have connectivity to the CPU 102 such as may be the case where the PCIe switch 202 has an insufficient number of PCIe lanes and connections to provide connectivity to both the M PDs 107 as well as the N PD 106. Generally, N and M can each be any suitable number of PDs that vary with embodiment. N can denote the number of PDs 106 currently configured in the system with connectivity indirectly to the CPU 102 through the PCIe switch 202; and M can denote the number of additional PDs for which there can be physical space for in the system but for which there are no available connections and PCIe lanes from the M PDs 107 to the PCIe switch 202. Thus in the example 200, the switch 202 can accommodate at most "N" PCIe connections, each of which is 2 lanes (×2).

The CPU 102 of the data storage system can generally have a limited number of lanes or pins that can be configured with connectivity to other devices or components. With reference to the example topology of FIG. 3, the CPU 102 can have 16 lanes configured for communication with PDs of the system. Generally, the CPU 102 can be configured to have connectivity directly to the PDs (not illustrated in FIG. 3) or indirectly via a switch such as the PCIe switch 202. The PCIe switch 202 can be used to provide connectivity indirectly between the PDs and the CPU 102 when there is an insufficient number of PCIe lanes from the connection 203 from the CPU 102 to connect directly to all the desired PDs. In this case, a topology can be used as illustrated in FIG. 3 where the CPU 102 is configured to indirectly connect to the N PDs 106, where N can generally be any suitable number of PDs, through the PCIe switch 202.

The data storage system of the example 200 can include the I/O slots 210a-d into which I/O cards or I/O modules (e.g., such as PCIe (Peripheral Component Interconnect Express) boards, modules or cards) may be inserted. Such inserted I/O cards or modules can support additional I/O ports providing additional I/O connections in a system. For example, the I/O slots can be used with I/O modules or cards providing additional front end I/O ports or connections (e.g., front end connectivity) between the data storage system and one or more hosts which are external to the data storage system such as, for example, illustrated and described in connection with FIG. 1. As another example, an inserted I/O card can be a NIC (network interface controller, component or card) facilitating communication between the data storage system and a network. As another example, an inserted I/O card can be a Smart NIC which includes one or more processors, memory, executable code, other hardware components (e.g., such as a dedicated hardware component that performs compression and decompression or encryption and decryption), and the like, to perform additional offload processing that would otherwise be performed using a system or main CPU of the data storage system.

The data storage system including the components of FIG. 3 can include an internal network fabric that operates in accordance with the PCIe protocol. Generally, PCIe is a packet-based protocol that uses serial, point-to-point wired, individually clocked 'lanes', where each lane includes two pairs of data lines that can carry data upstream and downstream simultaneously (full-duplex). In at least one embodiment, the CPU 102 may have one or more PCIe connections from the CPU 102 to another component, such as the PCIe switch 202 and the I/O slots 210a-d. A PCIe connection consists of one or more data-transmission lanes, connected serially. As noted above, each lane consists of two pairs of wires, one for receiving and one for transmitting. PCIe lanes are internal, high-speed, point-to-point, bidirectional connections. As noted above, multiple PCIe lanes can be combined or grouped into a single high-bandwidth channel sometimes referred to as a PCIe connection or link. Generally, a PCIe link or PCIe connection can include one or more lanes. For example, groups of 2, 4, 8 and 16 PCIe lanes may be so combined and are denoted, respectively, as ×2, ×4, ×8, and ×16 (although other groupings are possible).

Referring to FIG. 3, the element 203 denotes a single port 16 lane (×16) PCIe connection between the CPU 102 and the PCIe switch 202; the elements 205a-n each denote a single port ×2 PCIe connection between the PCIe switch 202 and an associated one of the N PDs 106a-n; the elements 212a-b each denote a single port ×16 PCIe connection between the CPU 102 and one of the I/O slots 210a-b; and the elements 212c-d each denote a single port ×8 PCIe connection between the CPU 102 and one of the I/O slots 210c-d.

The PCIe switch 202 operates to provide the point-to-point connections between the components connected to ports of the switch 302. In particular, the PCIe switch 202 forwards or routes packets from an ingress port of the switch to an egress port of the switch. In at least one embodiment, the PCIe switch 202 can be configured so that the connections 203 and 205a-n are bidirectional. The connections 212a-d, respectively, to the I/O slots 210a-d can be configured as bidirectional connections for transmissions between the CPU 102 and the I/O slots 210a-d.

In at least one embodiment, the CPU 102 can have 16 lanes (denoted as ×16 of connection 203) for use in connecting to the PDs of the PCIe fabric which, in the aggregate, can use no more than the available ×16 PCIe lanes of the CPU. In this manner, the PCIe switch 202 can be used to switch and route communications between the CPU 102 and the PDs 106 connected to the switch 202. In the example 300, the PCIe switch 202 operates to route packets, for example, from the CPU 102 to the PDs 106 (e.g., over the connections 205a-n). Thus, the CPU 102 can communicate with the PDs 106 via the switch 202, for example, to read data from one or more of the PDs 106 and/or write data to one or more of the PDs 106.

For simplicity of illustration, each of the N PDs 106 and each of the M PDs 107 can be configured to have a 2 PCIe lane port connection. However, more generally, PDs can be configured with connections of any suitable number of PCIe lanes. Also, particular numbers of PCIe lanes are illustrated in FIG. 3 for other connections for illustration purposes but more generally a system can include any suitable number of connections of any suitable number of one or more PCIe lanes. In a similar manner, FIG. 3 includes specific numbers of components, such as 4 I/O slots for illustration. More generally, the data storage system can include any number of components of different types.

The FIGS. 4A and 4B discussed below illustrate one example of a data storage system. Also as discussed below, the components of FIG. 3 can be included in the data storage system illustrated by FIGS. 4A and 4B.

Figure 4A:
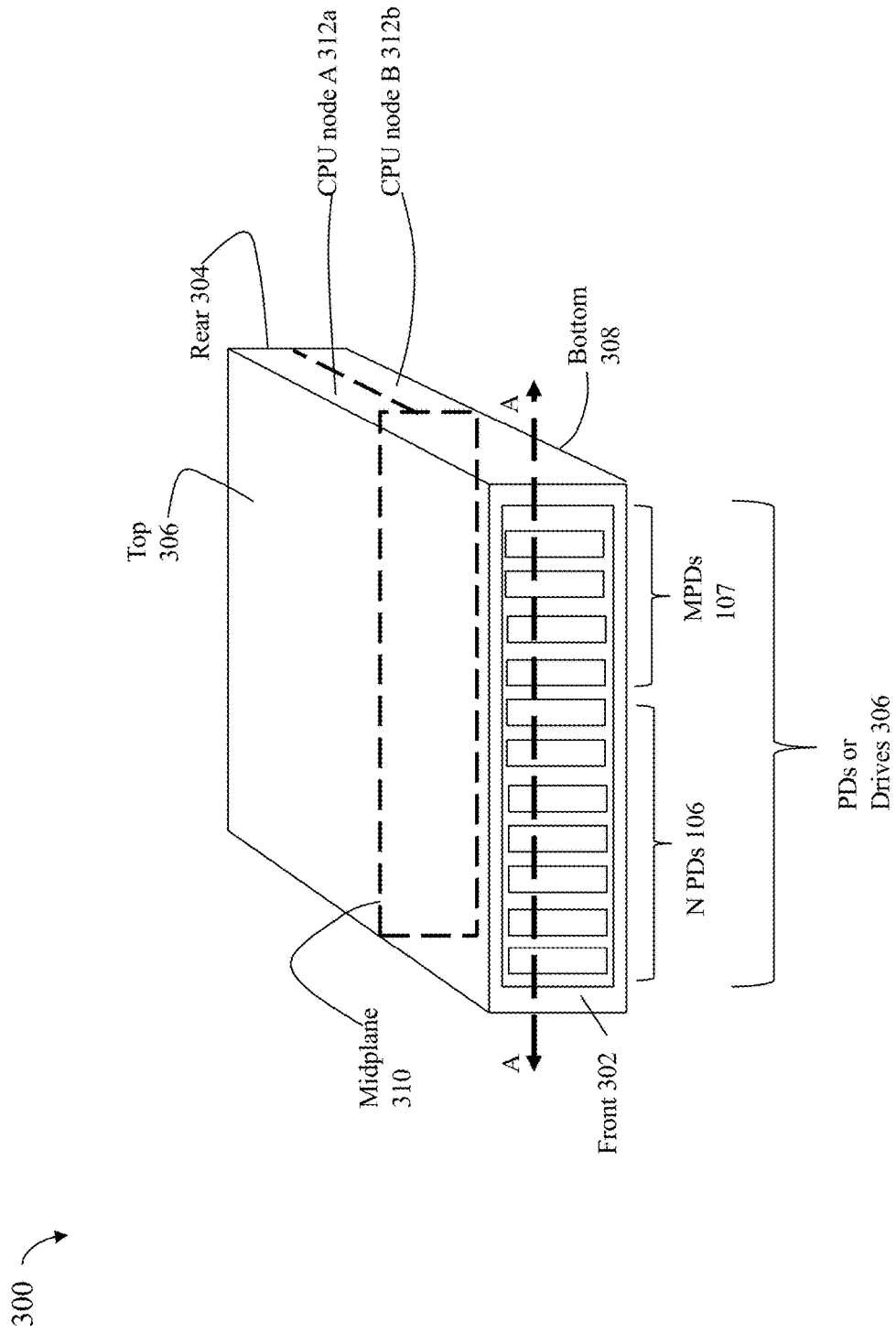

Referring to FIG. 4A, shown is an example 300 illustrating a chassis or DAE in at least one embodiment in accordance with the techniques of the present disclosure. The chassis of FIG. 4A and its components can form the base enclosure of a data storage system in at least one embodiment as discussed above.

The example 300 illustrates a chassis or DAE with a front face 302, rear face 304, top face 406 and bottom face 308. On the front face 302 illustrated is a row of front facing PDs or drives 306 inserted into drive slots of the chassis. Internally the chassis can include a midplane 310 and CPU modules or nodes 312a-b. The PDs or drives 306 can collectively include the N connected PDs 106 as described in connection with FIG. 3 and also include the M unconnected PDs 107 as described in connection with FIG. 3. The midplane 310 can be a PCB which, in the example 300, is vertically positioned within the chassis on its edge with the larger flat faces of the midplane 310 facing the front 302 and the rear 304 of the chassis. Generally, the midplane 310 provides power and signal interconnects between the front facing PDs 106 and the rear facing CPU nodes 312a-b. More generally, the midplane 310 can distribute power and signals to components in the chassis. In the example 300, the chassis includes 2 CPU nodes or modules 312a-b stacked from top to bottom within the chassis. The midplane 310 separates the front-facing PDs 306 from the rear-facing CPU nodes 312a-b. The CPU nodes 312a-b and the N connected PDs 106 can plug directly into the midplane 310. In the example 300, the M unconnected PDs 107 can reside physically in the chassis but may not be connected or plugged into the midplane 310.

Figure 4B:
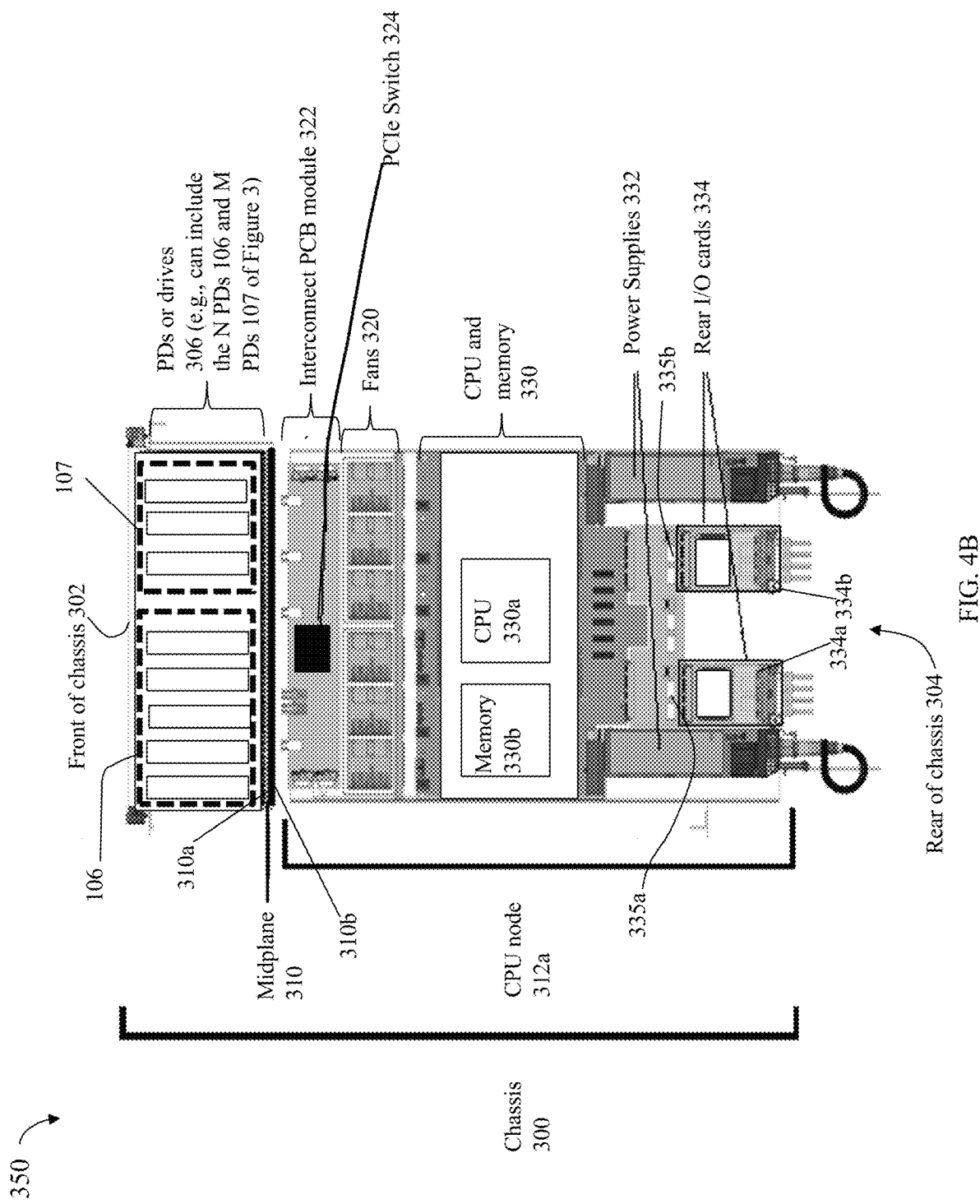

Referring to FIG. 4B, shown is an example 350 illustrating a cross sectional top view of the chassis taken along line A-A of FIG. 4A. Generally, similarly numbered components from FIG. 4A are also included in FIG. 4B.

The example 350 illustrates in further detail internal components of the chassis 300 with respect to one of the CPU nodes 312a. The remaining CPU node 312b can also include components similar to those illustrated and described in connection with FIG. 4B.

The example 350 illustrates the PDs or drives 306 comprising the N connected PDs 106 and the M unconnected PDs 107. The PDs 106 can be plugged into or connected to the midplane 310. However, the M PDs 107 may not be plugged into or connected to the midplane 310. The example 350 also illustrates the CPU node 312a connected to the midplane 310. The midplane 310 can include first connectors to the PDs 106 on the front facing side 310a of the midplane 310. The PDs 106 can plug directly into the first connectors of the front facing side 310a of the midplane 310. Over such first connectors, the PDs 106 can send signals to, and receive signals from, the CPU nodes 312a-b, and over such first connectors, the PDs 106 can receive power from the CPU nodes 312a-b. The rear facing side 310b of the midplane 310 can include second connectors to the CPU nodes 312a-b and can be used to send power and PCIe and management signals from the CPU nodes 312a-b. Additionally, the second connectors of the rear facing side 310b of the midplane 310 can be used to send signals to the CPU nodes 312a-b. The CPU nodes 312a-b can plug directly into the second connectors of the rear facing side 310b of the midplane 310. The midplane 310 can facilitate easily inserting or removing components from the first and second connectors, respectively, of its front and rear facing sides 310a-b. For example, each of the PDs 306 can be independently inserted or removed from the front 302 of the chassis 300 such as, for example, to facilitate replacement of such PDs. The midplane 310 can be configured to electrically interface the plugged in N PDs 106 with the interconnect PCB module 322 of the CPU nodes 312a-b. As another example, each of the CPU nodes 312a-b can be independently inserted or removed from the rear 304 of the chassis 300 such as, for example, to facilitate replacement of such CPU nodes.

In the example 350, the CPU node 312a can include an interconnect PCB module (sometimes referred to as the interconnect module) 322, fans 320, a CPU 330a, memory 330b, power supplies 332, and rear I/O cards 334a-b inserted, respectively, into the I/O slots 335a-b. The power supplies 332 can provide power to the components of the chassis 300. The power supplies 332 can be connected to an external power source providing power to components of the chassis. The fans 320 can be used to cool components within the chassis 300. The CPU and memory 330 can include the CPU 330a similar to the CPU 102 of FIG. 3. The rear I/O slots 335a-b can be I/O slots similar to any of the I/O slots 212a-d of FIG. 3. The PDs 306 can include both the connected N PDs 106 of FIG. 3 as well as the disconnected or unconnected M PDs 107 of FIG. 3. The interconnect module 322 can include a PCIe switch 324 that can be used in a manner similar to the PCIe switch 202 of FIG. 3. In this manner, the connectivity and topology generally described in connection with FIG. 3 can be implemented in connection with the components of the chassis in the example 350 of FIG. 4B. In particular, in the embodiment of FIGS. 3, 4A and 4B, the data storage system can include a chassis which is capable of housing both the currently connected N PDs 106 and additionally the unconnected M PDs 107 which can be placed physically in the chassis. However, the unconnected M PDs 107 are not be plugged into the midplane 310, and also do not have connectivity to the PCIe switch 320 and CPU nodes 312a-b. In the particular scenario of FIGS. 3, 4A and 4B, the problem can be that the PCIe switch 324 does not have a sufficient number of PCIe lanes like that as described in connection with the PCIe switch 202 of FIG. 3. In particular, the PCIe switch 324 does not have enough PCIe lanes to provide connectivity to both the N PDs 106 and also the M PDs 107. Thus, PCIe lanes from the switch 324 can be connected to the N PDs 106 but not the M PDs 107.

Consistent with other discussion herein, without use of the techniques of the present disclosure, if the data storage system has an indirect connectivity model of the CPU-PD connections as discussed in connection with FIGS. 3, 4A and 4B, then one alternative solution may be to add a larger PCIe switch to expand the number of PCIe switch connections and lanes to provide connectivity between the CPU and the additional unconnected PDs 107. In at least one system as illustrated in FIG. 4B where the PCIe switch 324 is configured as an integrated component of the CPU nodes 312a-b, without using the techniques of the present disclosure, the entire CPU node may have to be replaced, where the replacement CPU node includes the larger PCI switch with the expanded number of PCIe switch connections and lanes for the additional PDs 107. The foregoing can be highly undesirable due to the costs associated with requiring an expensive replacement CPU node that replaces a healthy working CPU node. Additionally, physically removing and replacing the existing CPU node results in taking the existing CPU node offline which, in a dual-node system, reduces the system performance since there is only a single CPU node online during the CPU node replacement time period.

What will now be described in the following paragraphs are techniques of the present disclosure that can be used to provide connectivity between the CPU (330a of FIG. 4B and 102 of FIG. 3) and the unconnected M PDs 107 (e.g., the PDs 306 of FIG. 4B collectively represent the N connected PDs 106 of FIG. 3 and the M unconnected PDs 107 of FIG. 3).

It should be noted that the techniques of the present disclosure can also be used in connection with a data storage system having a direct connectivity model of the CPU-PD connections rather than an indirect connectivity model as discussed above.

Figure 5:
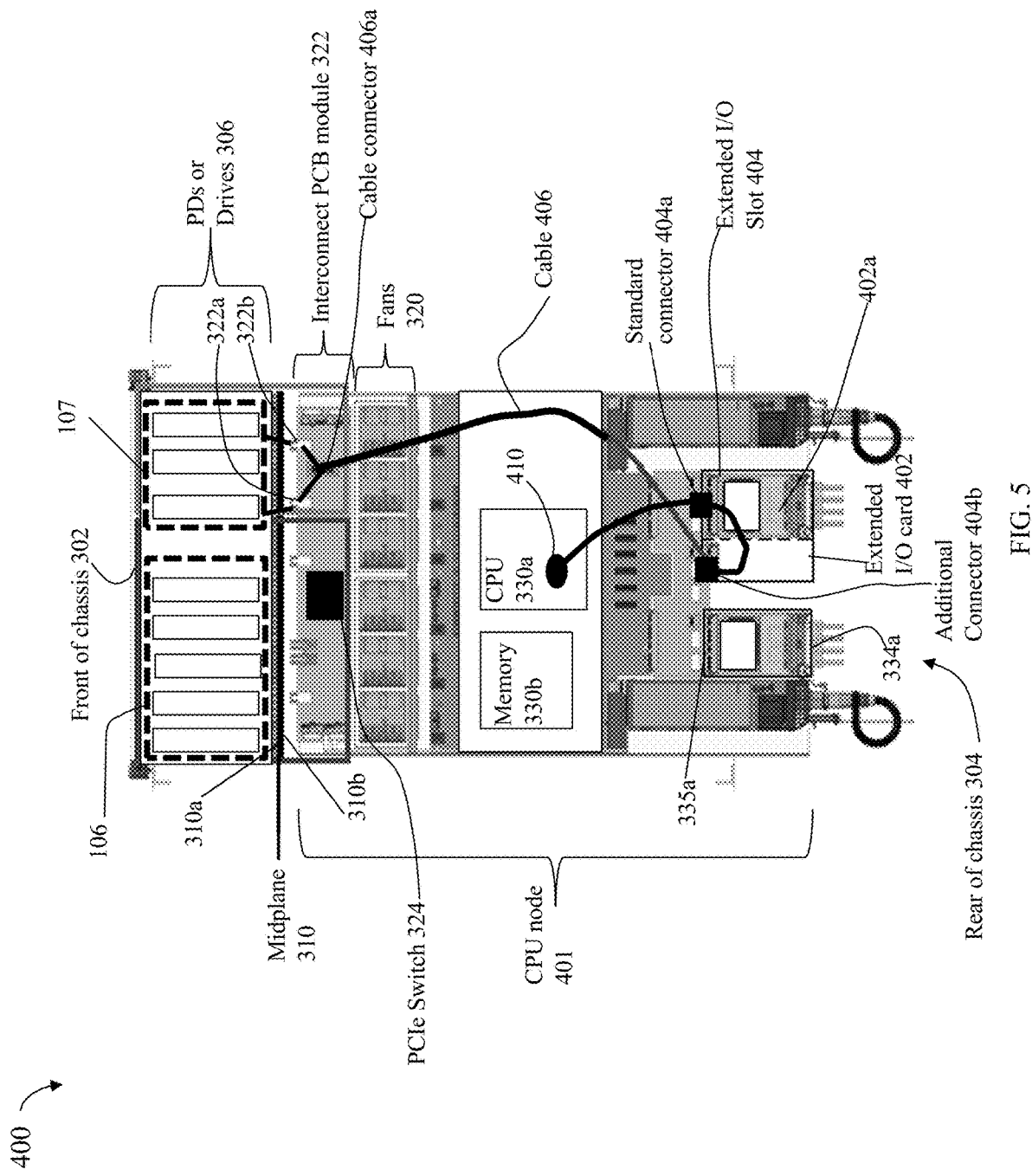

Referring to FIG. 5, shown is an example 400 of a data storage system illustrating an embodiment in accordance with the techniques of the present disclosure. The example 400 generally includes similarly numbered components as described in connection with FIG. 4B with the differences discussed below.

In the example 400, a first number of PCIe lanes between the CPU 330a and the extended I/O slot 404 can be configured to provide first PCIe connectivity between the extended I/O slot 404 and the CPU 330a. In particular, the first number of PCIe lanes is represented in FIG. 5 by the line between 410 of the CPU 330a and the standard connector 404a of the extended I/O slot 404. In at least one embodiment, the first PCIe connectivity provided by the first number of PCIe lanes between 410 and 404a can be implemented using conductive pathways between 410 and 404a, or more generally, between the CPU 330a and the extended I/O slot 404.

The element 402a denotes a non-extended I/O card which can be inserted into the extended I/O slot 404, and the element 402 denotes an extended I/O card which can alternatively be inserted into the extended I/O slot 404. In at least one embodiment, the extended I/O slot 404 can be configured to receive the non-extended I/O card 402a and the extended I/O card 402.

In accordance with the techniques of the present disclosure and the example 400, when the extended I/O card 402 is inserted in the extended I/O slot 404, loop back connectivity can be generally configured between two connection points of the extended I/O card slot 404 to create a loop back path from the extended I/O slot 404 back to the extended I/O slot 404. The loop back connection or path provides for routing signals received at a first of the two connection points to the second of the two connections points thereby forming a loop back connection at the extended I/O card slot between the two connection points, where one of the two connection points receives a signal that is routed by the inserted extended I/O card to the second of the two connection points. In at least one embodiment, the two connection points can be two connectors of the extended I/O card slot. In particular in at least one embodiment as denoted by the example 400, the two connectors of the extended I/O card slot 404 used to provide the loop back connection can include a standard connector 404a, which can be used by both extended and non-extended I/O cards inserted into the extended I/O card slot, and an additional connector 404b. Consistent with other discussion herein in such an embodiment, the additional connector 404b can be used by the extended I/O card 402 inserted into the extended I/O slot 404 but which is not used by non-extended I/O cards, such as illustrated by 402a, which can alternatively be inserted into the extended I/O slot 404. Thus, the standard connector 404a can be used by the extended I/O card 404 when inserted into the extended I/O slot 404. Additionally, the standard connector 404a can be used by the non-extended I/O card 402a when the non-extended I/O card 402a is inserted into the extended I/O slot 404 rather than the extended I/O card 402. The additional connector 404b can be used by the extended I/O card 404 when inserted into the extended I/O slot 404 but is, however, not used by the non-extended I/O card 402a when alternatively inserted into the extended I/O slot 404. In at least one embodiment, the additional connector 404b can be characterized as a reserved connector or a dedicated connector for use only by the extended I/O card 404 for providing the loop back connectivity described herein for use with the techniques of the present disclosure. Thus, the loop back path or connection between the connectors 404a-b can occur when the extended I/O card 402 is inserted into the extended I/O slot 404 but not when the non-extended I/O card 402a is alternatively inserted into the extended I/O slot 404.

In the example 400, the extended I/O card 402 is illustrated generally as having a larger relative physical size and larger dimension(s) that the non-extended I/O card 402a in order for the extended I/O card 402 to plug into both the connectors 404a-b whereas the non-extended I/O card 402a is illustrated as only plugging into the connector 404a but not 404b. More generally, the cards 402 and 402a can be any suitable physical size and dimensions. Also in at least one embodiment, when the non-extended I/O card 402a is inserted into the extended I/O slot 404, the card 402a does not have connectivity to, or more generally does not use, the additional connector 404b. More generally, a distinction or difference between the non-extended I/O card 402a and the extended I/O card 402 can be that the card 402a is not configured to provide the loop back path or connectivity between the connectors 404a and 404b, and the card 402 is configured to provide the loop back path or connectivity between the connectors 404a and 404b.

The loop back connection is represented in FIG. 5 by the line between the standard connector 404a and the additional connector 404b. In at least one embodiment, the loop back connectivity between 404a and 404b can be configured and established by the extended I/O card 402 when the extended I/O card 402 is inserted into the extended I/O slot 404.

In the example 400, a second number of PCIe lanes between the extended I/O slot 404 and the additional PDs 107 can be configured to provide second PCIe connectivity between the extended I/O slot 404 and the additional PDs 107. In particular, the second number of PCIe lanes is represented in FIG. 5 by the lines between the connector 404b of the extended I/O slot 404 and the additional PDs 107 (e.g., line from 404b to 406a, line from 406a to 322a, line from 406a to 322b, line from 322a to the additional PDs 107, and line from 322b to the additional PDs 107).

In at least one embodiment, the second PCIe connectivity can be provided using one or more means to connect the additional connector 404b, or more generally the extended I/O slot 404, to the additional PDs 107. In the example 400, a cable 406 can be used to connect the extended I/O slot 404 to the interconnect module 322. In at least one embodiment, the cable connector 406a can be added on the interconnect module 322, where the cable 406 connects (electrically connects) the additional connector 404b to the cable connector 406a thereby providing connectivity between the extended I/O slot 404 and the interconnect module 322. The second number of PCI lanes noted above can be routed from the additional connector 404b of the extended I/O slot over the cable 406 to the interconnect module 322. Additional means, such as conductive pathways embedded in the interconnect module 322, can provide further connectivity between the cable connector 406*a* of the interconnect module 322 and the midplane connectors 322*a-b*. The CPU node 401, or more specifically the interconnect module 322 of 401, can be plugged into the connectors 322*a-b* of the midplane 310 as well as other connectors on the rear facing side 310*b* of the midplane 310. The midplane connectors 322*a-b* can have connectivity to the additional PDs 107 plugged into other connectors on the front side 310*a* of the midplane 310. In this manner, connectivity between the additional connector 404*b* of the extended I/O slot 404 and the additional PDs 107 can route the second number of PCIe lanes from the extended I/O slot 404 to the additional PDs 107. Generally, the second number of PCIe lanes connecting the extended I/O slot 404 to the additional PDs 107 can be configured into any suitable number of connections to the additional PDs 107. For example in at least one embodiment, each of the additional PDs 107 can be configured to have a single ×2 port whereby the second number of PCIe lanes can be configured into a suitable number of ×2 connections to the extended I/O slot 404. Generally, the second number of PCIe lanes from the extended I/O slot 404 can connect to any one or more of the additional PDs 107.

Generally, the example 400 illustrates one embodiment in accordance with the techniques of the present disclosure in which connectivity is configured and established between the CPU 330*a* and one or more of the additional PDs 107 using an overall path that includes a first connection or first connectivity between the CPU 330*a* and the standard connector 404*a* of the extended I/O slot 404, a second connection or connectivity that is a loopback connection or provides loop back connectivity between the standard connector 404*a* of the extended I/O slot 404 and the additional connector 404*b* of the extended I/O slot 404 (when the extended I/O card 402 is inserted in the extended I/O slot 404), and a third connection or connectivity between the additional connector 404*b* of the extended I/O slot 404 and the additional PDs 107. Consistent with other discussion herein, the third connection or third connectivity can generally comprise any suitable number of connections to individual ones of the PDs 107, where the number of connections to the PDs 107 can be configured from the PCIe lanes of the third connection or connectivity between 404*b* and the additional PDs 107.

As discussed above in the example 400, the extended I/O slot 404 includes a standard connector 404*a* with upstream PCIe lanes from the CPU 330*a*. The extended I/O slot 404 also includes an additional connector 404*b* with downstream PCIe lanes that can be used in providing connectivity to the additional PDs 107. The extended I/O slot 404 can be configured to receive a regular or standard (e.g., non-extended) I/O card 402*a*. Additionally, the extended I/O slot can be configured to also receive an extended I/O card 402. When the non-extended I/O card 402*a* is inserted into the extended I/O slot 404, the non-extended I/O card 402*a* can be configured to only use the standard connector 404*a* and its upstream PCIe lanes from the CPU 330*a* does not use the additional connector 404*b* with its downstream PCIe lanes. In contrast, when the extended I/O card 402 is inserted into the extended I/O slot 404, the extended I/O card 402 uses both the standard connector 404*a* and its upstream PCIe lanes from the CPU 330*a* and also uses the additional connector 404*b* and its downstream PCIe lanes to the additional PDs 107. The extended I/O card 402, when inserted into the extended I/O slot 404, routes or loops back the upstream PCIe lanes from the CPU (e.g., of the standard connector) to the downstream PCIe lanes of the additional connector 404*b* of the extended I/O slot, where the downstream PCIe lanes of the additional connector 404*b* of the extended I/O slot provide connectivity to the PDs 107. The additional connector 404*b* of the extended I/O slot can be connected to the interconnect module 322 using a cable that is internal within the chassis. The cable can connect the additional connector 404*b* of the extended I/O slot with a cable connector 406*a* on the interconnect module 322. The PCIe lanes of the additional connector 404*b* can connect the additional connector 404*b*, via the cable 406, to the interconnect module 322, where the PCIe lanes from the additional connector 404*b* can then be routed (e.g., such as using pathways of the interconnect module 322) to the PDs 107.

In at least one embodiment, the first number of PCIe lanes, X1, between the CPU 330*a* and the standard connector 404*a* (or more generally the extended I/O slot 404) can be the same as the second number of PCIe lanes, X2, between the additional connector 404*b* (or more generally the extended I/O slot 404) and the additional PDs 107. In such an embodiment, the extended I/O card 402 can be configured to generally receive X1 upstream PCIe lanes from the standard connector 404*a* and then route the X1 upstream PCIe lanes to the downstream additional connector 404*b* to form the loop back path at the extended I/O slot 404.

In at least one embodiment, one or more intervening components can be connectively disposed on the loop back path between the connectors 404*a-b* when the extended I/O card is inserted into the extended I/O slot. The one or more intervening components can be included on the extended I/O card and configured for use when the extended I/O card 402 is inserted into the extended I/O slot 404. For example, the one or more intervening components can include an intervening PCIe retimer discussed above. In at least one embodiment where X1=X2, the input and output signal of the intervening PCIe retimer can be the same number of lanes.

As a variation, X1 and X2 can be different whereby one or more additional intervening components can be configured to provide any needed lane expansion or reduction therebetween. For example, it may be that X1=8 PCIe lanes between 410 of the CPU 330*a* and the standard connector 404*a* of the extended I/O slot 404. Additionally, it may be that X2=20 PCIe lanes between the additional connector 404*b* of the extended I/O slot 404 and the additional PDs 107, where M=10, so that there are 10 additional PDs 107, each having a 2 lane connection for a total of 20 lanes to the additional PDs 107. In this case, an intervening PCIe switch connectively disposed on the loop back path between the connectors 404*a-b* can provide connectivity between the X2=20 downstream lanes and the X1=8 upstream lanes to the CPU 330*a*. Generally, the intervening PCIe switch can be used, for example, in a manner as described in connection with the PCIe switch 202 of the FIG. 3 with an indirect connectivity model or topology. In at least one embodiment, the one or more additional intervening components, such as the intervening PCIe switch, can be included in the extended I/O card 402.

Figure 6:
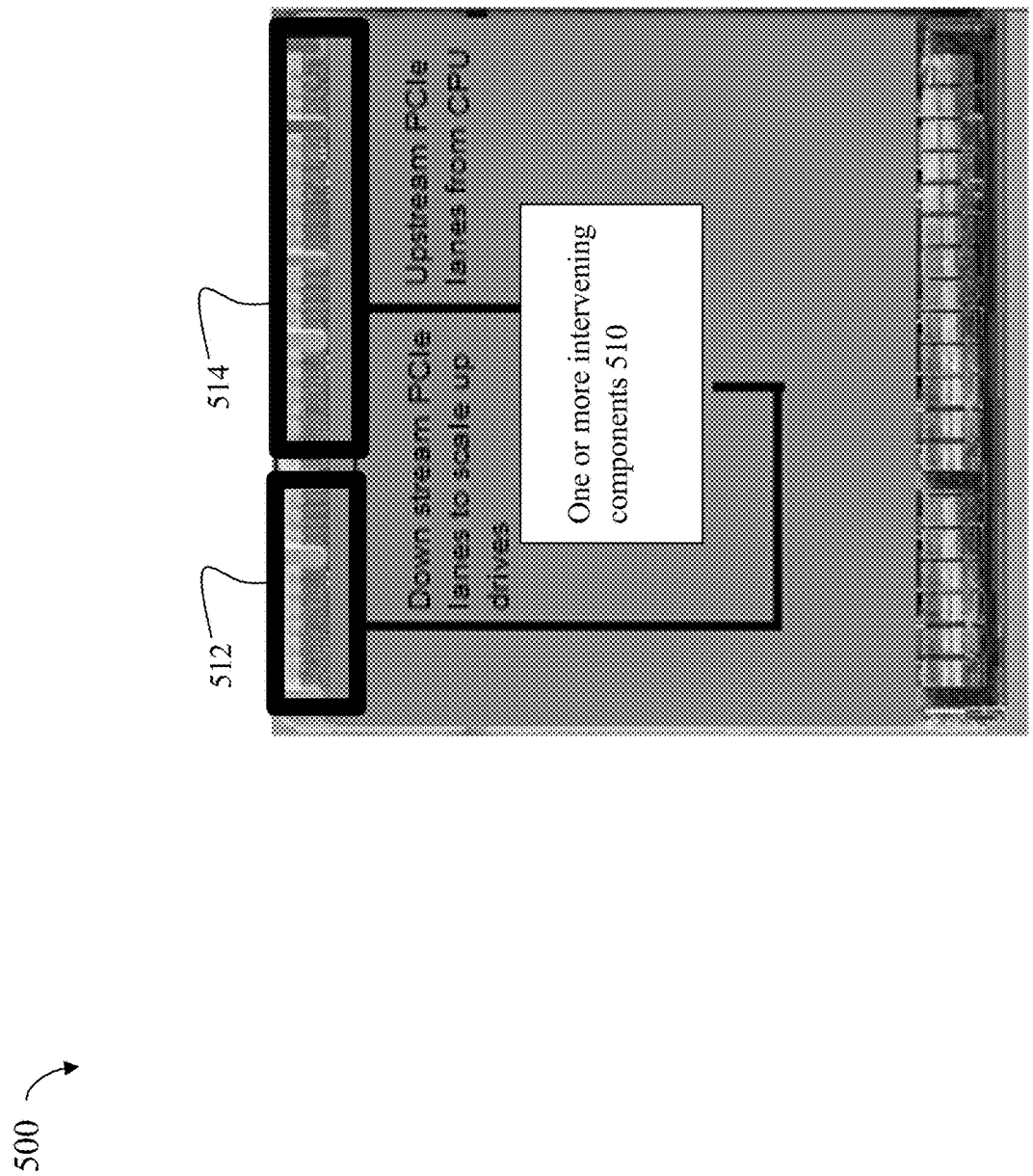

Referring to FIG. 6, shown is an enlarged view 500 of the extended I/O card 402 that can be inserted into the extended I/O slot 404 in at least one embodiment in accordance with the techniques of the present disclosure. In particular, the example 500 provides an enlarged view of representing the extended I/O card 402 as described in connection with the FIG. 5 in at least one embodiment in accordance with the techniques of the present disclosure.

The example 500 includes the one or more intervening components 510, the element 512 denoting the standard connector providing the connectivity to the CPU 330a, and the element 514 denoting the additional connector providing the connectivity to the additional PDs 107. The element 514 can generally denote connectivity from the extended I/O card (and thus the standard connector) to the CPU 330a, and thus, the upstream PCIe lanes from the CPU 330a. The element 512 can generally denote connectivity from the extended I/O card (and thus the additional connector) to the additional PDs 107, and thus, the downstream PCIe lanes to the PDs 107.

In at least one embodiment as noted above, the PCIe lanes from the CPU of the standard connector 404a of the extended I/O slot 404 can be looped back and out through the downstream PCIe lanes of the additional connector 404b by the inserted extended I/O card 402 without any intervening components connectively disposed between 404a-404b. An example of the foregoing embodiment in which there are no intervening components is illustrated in more detail with reference now to the example 800 of FIG. 7A.

Figure 7A:
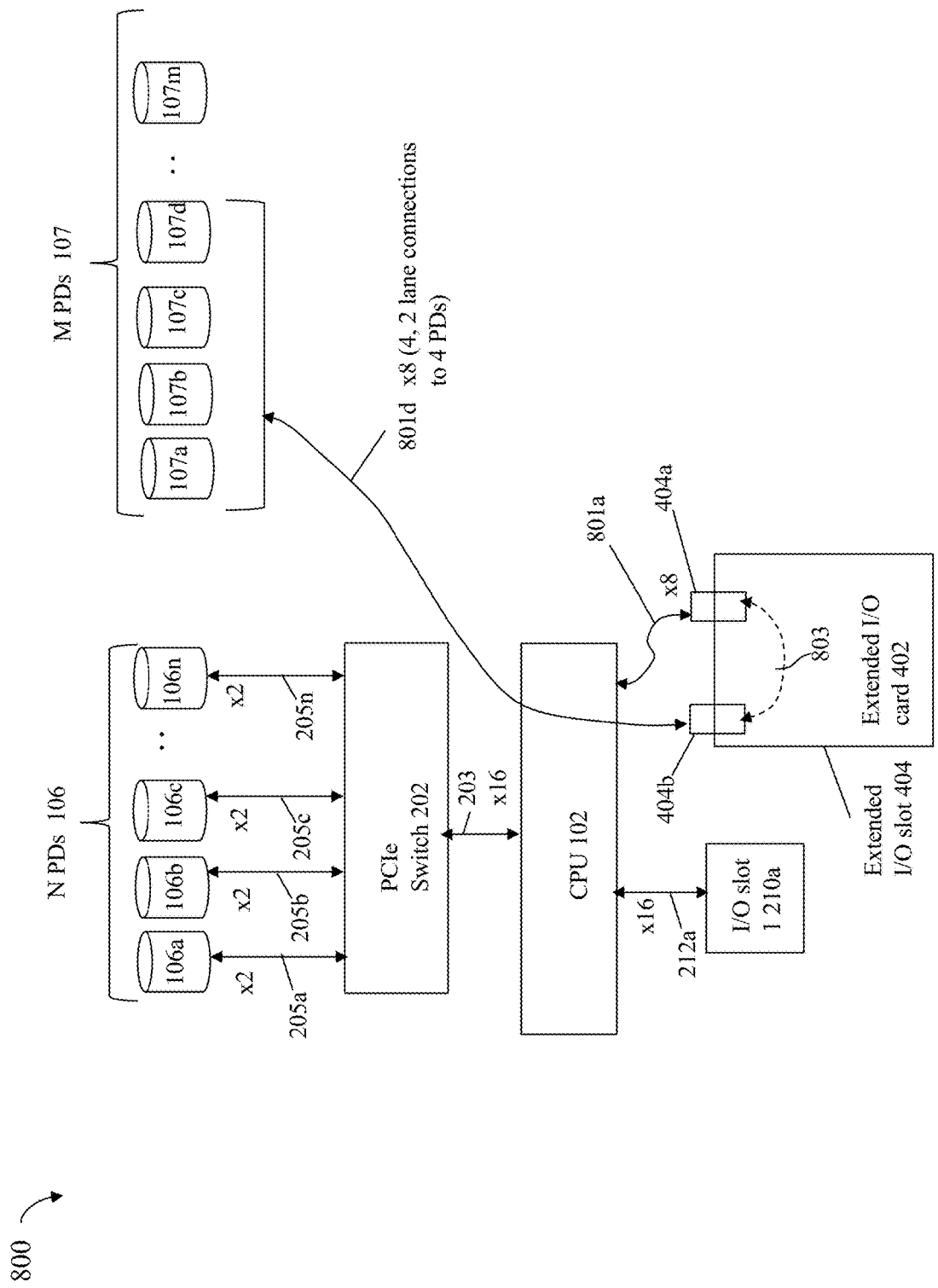

FIG. 7A includes components similarly numbered as in FIG. 3 with differences discussed below. In the example 800, the data storage system includes one standard or regular I/O slot 210a as in FIG. 3 (e.g., configured to receive the non-extended I/O card but not the extended I/O card) and the extended I/O slot 404 as described in connection with FIG. 5. The example 800 also illustrates the extended I/O card 402 of FIG. 5 inserted into the extended I/O slot 404. In the example 800, there are 8 upstream PCIe lanes 801a from the CPU 102 to the standard connector 404a of the extended I/O slot 404. The 8 upstream PCIe lanes 801a further have connectivity between the standard connector 404a and the extended I/O card 402 since the extended I/O card is inserted into the extended I/O slot 404. In this example, assume M=20 so there are 20 additional PDs 107 and it is desired to only provide connectivity between the CPU 102 and 4 of the additional PDs 107a-d denoting 4 of the unconnected PDs 107, where each of the 4 PDs (107a-d) uses 2 lanes for a total of 8 lanes configured as 4, ×2 lane, connections, to the PDs 107a-d. In this manner, the 8 lanes 801a from the CPU to the standard connector 404a can be routed or looped back (803) to the downstream PCIe lanes 801d between the additional connector 404b and the PDs 107a-d. Since the extended I/O card 402 is inserted into the extended I/O slot 404, the downstream PCIe lanes 801d are further connected from the additional connector 404b and the extended I/O card 402.

As a variation in at least one embodiment as discussed above, the PCIe lanes from the CPU of the standard connector 404a of the extended I/O slot can be looped back and out through the downstream PCIe lanes of the additional connector 404b by the inserted extended I/O card after transmission through one or more intervening components connectively disposed between 404a-404b. The intervening component(s) can be included in the extended I/O card. An example of one such embodiment in which the intervening component is a PCIe retimer is illustrated in more detail with reference now to the example 820 of FIG. 7B.

FIG. 7B includes components similarly numbered as in FIG. 7A with differences discussed below. In the example 820, the data storage system includes one standard or regular I/O slot 210a and the extended I/O slot 404 as described in connection with FIG. 7A. The example 820 also illustrates the extended I/O card 802 of FIG. 5 inserted into the extended I/O slot 404. In the example 820, there are 8 upstream PCIe lanes 801a from the CPU 102 to the standard connector 404a of the extended I/O slot 404. The extended I/O card 402 is inserted into the extended I/O slot 404. Also assume M=20 so there are 20 additional PDs 107 and it is desired to only provide connectivity between the CPU 102 and 4 of the additional PDs 107a-d denoting 4 of the unconnected PDs 107, where each of the 4 PDs (107a-d) uses 2 lanes for a total of 8 lanes configured as 4, ×2 lane connections, to the PDs 107a-d. In this manner, the 8 lanes 801a from the CPU to the standard connector 404a can be routed or looped back (824) to the downstream PCIe lanes 801d between the additional connector 404b and the PDs 107a-d. Additionally, the extended I/O card 402 includes the intervening PCIe retimer 822 connectively disposed between the connectors 404a and 404b where the loop back path 824 passes through the intervening retimer 822.

In at least one embodiment as discussed above, the PCIe lanes from the CPU of the standard connector 404a of the extended I/O slot can be looped back and out through the downstream PCIe lanes of the additional connector 404b by the inserted extended I/O card after transmission through one or more intervening components connectively disposed between 404a-404b. The intervening component(s) can be included in the extended I/O card. An example of one such embodiment in which the intervening component is a PCIe switch is illustrated in more detail with reference now to the example 840 of FIG. 7C.

Figure 7C:
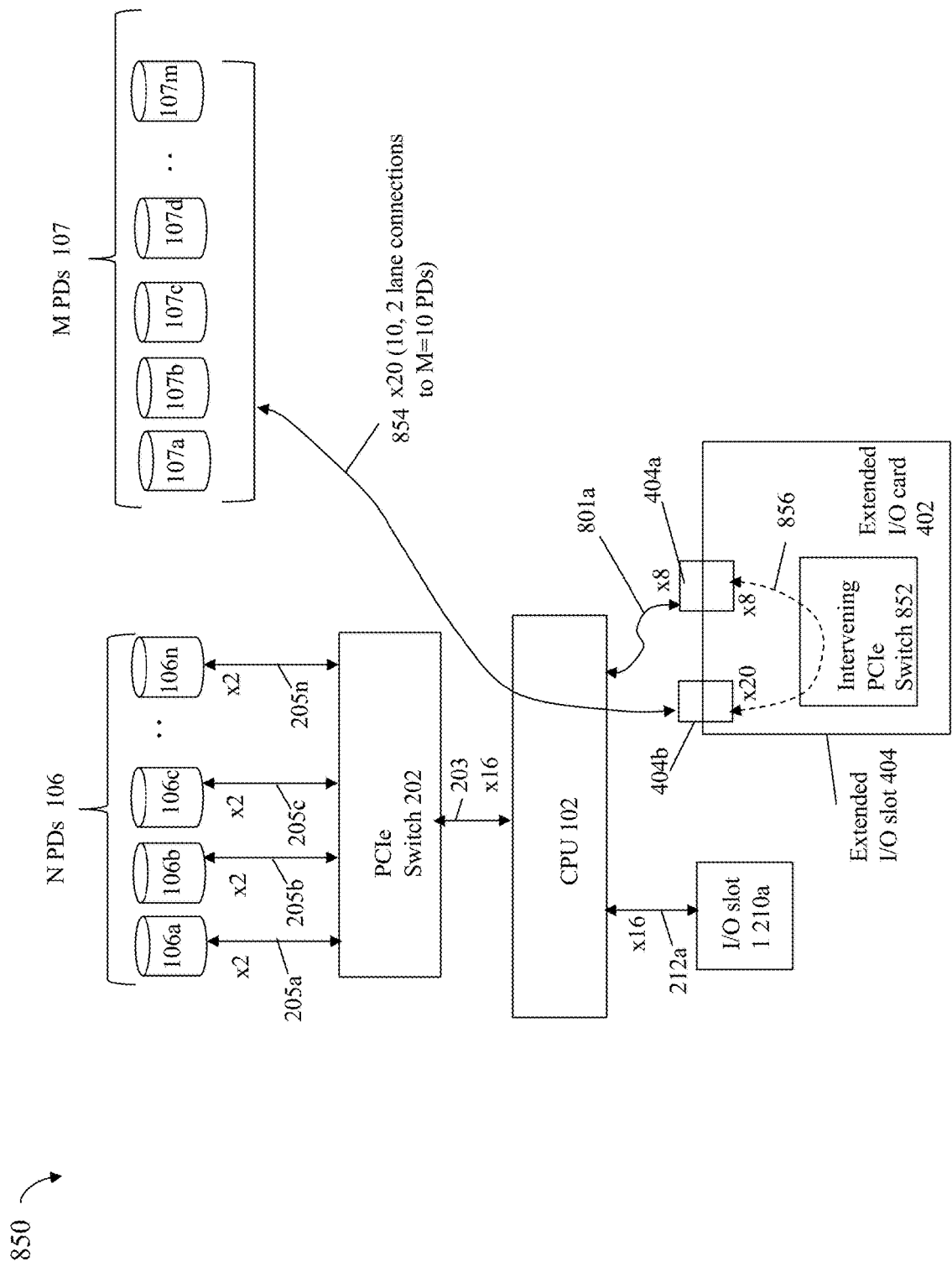

FIG. 7C includes components similarly numbered as in FIG. 7B with differences discussed below. In the example 850, the data storage system includes one standard or regular I/O slot 210a and the extended I/O slot 404 as described in connection with FIG. 7B. The example 850 also illustrates the extended I/O card 802 of FIG. 5 inserted into the extended I/O slot 404. In the example 850, there are 8 upstream PCIe lanes 801a from the CPU 102 to the standard connector 404a of the extended I/O slot 404. The extended I/O card 402 is inserted into the extended I/O slot 404. Also assume M=10 so there are 10 additional PDs 107 and it is desired to provide connectivity between the CPU 102 and all M=10 of the additional PDs 107a-m, where each of the M=10 PDs uses 2 lanes for a total of 20 lanes configured as 10, ×2 lane connections, to the PDs 107a-m. In this manner, the 8 lanes 801a from the CPU to the standard connector 404a can be routed or looped back (856) to the 20 downstream PCIe lanes 854 between the additional connector 404b and the PDs 107a-m. Additionally, the extended I/O card 402 includes the intervening PCIe switch 852 connectively disposed between the connectors 404a and 404b where the loop back path 824 passes through the intervening switch 852. The intervening switch 852 can fan out the 8 lanes 801a from CPU 102 and the standard connector 404a to the 20 lanes 854 between the additional connector 404b and the M PDs 107. In the example 850, the 20 downstream lanes 854 can be configured as 10 connections to the M=10 PDs 107 where each of the 10 connections is 2 lanes. Thus, in at least one embodiment as illustrated in the example 850, the intervening component can be an intervening PCIe switch 852 that fans out the upstream PCIe lanes (801a from the CPU 102) of the standard connector 404a of the extended I/O slot 404 to any suitable number of configured connections to the M PDs 107. In this manner, the intervening PCIe switch 852 can be configured to provide connectivity between the 20 downstream lanes of 854 and the standard connector 404a where the standard connector 404a has connectivity to the CPU 102 over the 8 lanes upstream lanes 801a from the CPU 102.

With the embodiment such as illustrated in FIG. 7C, the PCIe switch 852 of the extended I/O card 402 can be used to generally expand the PCIe connectivity between the M PDs 107 and the CPU 102 through the loop back path or connection (856) between the connectors 404*a*-404*b* of the extended I/O slot 404. In this manner, the PCIe switch 852 allows expansion of the PCIe hierarchy where the PCIe switch 852 routes packets between the ×8 upstream lanes 801*a* and any of the 10×2 downstream connections (20 downstream lanes) 854.

The techniques of the present disclosure illustrated by the examples in the foregoing description can be used in a data storage system to provide a low cost option where a customer can upgrade their data storage system by increasing the number of PDs and provide additional connectivity between the newly added PDs and one or more CPUs of the data storage system. The CPUs can be main processors of the data storage system where each such CPU can be included in a separate computer node or module. In at least one existing data storage system having two existing CPU nodes and not using the techniques of the present disclosure, the customer may have been required to perform a costly upgrade and replace the existing two CPU nodes with new CPU nodes having the required components needed to provide the desired connectivity to the newly added PDs. In contrast, the techniques of the present disclosure can be used to provide a lower cost option providing the connectivity between each CPU and the newly added PDs using the extended I/O card and extended I/O slot. In a data storage system configuration where the CPU node is a single replaceable unit, the CPU node can be an existing CPU node including the extended I/O slot. The data storage system can be initially configured at a first point in time to include only N PDs 106 since such additional storage capacity is not yet needed. The initial configuration can generally include one or more CPU nodes each having at least one extended I/O slot as described herein. At a second point in time subsequent to the first point in time, M additional PDs 107 can be added to the data storage system such as due to the increased storage capacity needs of the customer. At the second point in time, the techniques of the present disclosure can be utilized to provide the additional connectivity between each of the CPUs of the CPU nodes and the M additional PDs 107 using an extended I/O card with each of the CPU nodes.

In at least one embodiment, each CPU node can be configured with generally one or more extended I/O slots. The particular embodiments described above have only a single extended I/O slot and extended I/O card used with each CPU node. However, more generally, a CPU node can be configured with multiple extended I/O slots described herein. In such an embodiment where the CPU node includes two or more extended I/O slots, the customer can be provided with further opportunities and flexibility to increase and/or decrease the number of PDs in the data storage system as the storage capacity requirements and needs of the customer can change over time. To further illustrate, assume each CPU node of the data storage system includes two extended I/O slots denoted as P and Q for purposes of reference and discussion. In such an embodiment, a first expansion or increase in the number of PDs can be performed as noted above at the second point in time using the extended I/O slot P and a first extended I/O card. At the second point in time, the customer can use the extended I/O slot Q with a non-extended or standard I/O card. Additionally, at a third point in time subsequent to the second point in time, the customer's storage need may further increase where the customer now needs to add yet even more PDs to the system. At the third point in time for each CPU node of the system, the customer can now use the extended I/O slot Q with a second extended I/O card to add the required connectivity between the CPU and the PDs added at the third point in time. Now further consider a fourth point in time subsequent to the third point time. At the fourth point in time, the customer's storage capacity requirements may decrease (relative to the storage capacity requirements of the third point in time) or, more generally, the customer may decide to reduce the number of PDs in the system and use one of the extended I/O slots P or Q for a different purposes. In any case at the fourth point in time, the customer can reduce the number of PDs for example to remove any PDs connected to the extended I/O slot P. The customer can now reuse the extended I/O slot P with any standard or non-extended I/O card since the extended I/O slot P is no longer used with the second extended I/O card.

Thus, the techniques of the present disclosure can provide many benefits to data storage customers with a low cost option for increasing the number of PDs in the data storage system. An additional benefit of using the techniques of the present disclosure is that, in at least one embodiment, the insertion of the extended I/O card into the extended I/O slot can be performed as a "hot" or dynamic insertion which does not require taking the CPU or CPU node offline. Thus, in at least one embodiment, the number of PDs in the data storage system can be performed in a non-disruptive manner without requiring any of the one or more CPUs of the system to be taken offline and without requiring any of the one or more CPUs of the data storage system to reboot. In at least one embodiment, the extended I/O card can also be hot swappable. For example, an existing I/O card can be currently inserted into the extended I/O slot. The existing I/O card can be swapped out and then replaced by inserting the extended I/O card into the extended I/O slot. In such an embodiment, the foregoing swapping out and replacement of the existing I/O card with the extended I/O card in the extended I/O slot can be performed in a non-disruptive manner for each CPU without requiring any of the one or more CPUs of the system to be taken offline and without requiring any of the one or more CPUs of the data storage system to reboot. In at least one embodiment, the hot swapping can be performed where the existing I/O card can be a non-extended I/O card or an extended I/O card.

The techniques of the present disclosure can also provide benefits by allowing the initial product offering and configuration of a data storage system to be reduced. For example, the initial configuration of a system does not have to configured with a more costly CPU node with more available PCIe lanes and/or a larger PCIe switch to provide connectivity to additional PDs that may not be currently needed at the time of initial configuration. The techniques of the present disclosure can be used as a low cost option to incrementally add PDs to the initial configuration without requiring CPU node replacement and without using an external additional enclosure with the added PDs.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A system comprising:
   one or more physical storage devices;
   a central processing unit (CPU); and
   an I/O slot including a first connector and a second connector, wherein the first connector is configured to have connectivity with the CPU over a first set of lanes, wherein the second connector is configured to have connectivity with the one or more physical devices over one or more connections configured from a second set of lanes between the second connector and the one or more physical storage devices, wherein the I/O slot is configured to receive an I/O card, and wherein, while the I/O card is inserted into the I/O slot, the I/O card is configured to:
   have connectivity to the first connector and the second connector, and
   provide connectivity of a loop back path between the first connector and the second connector; and
   wherein, while the I/O card is inserted into the I/O slot, the system is configured to:
   provide connectivity between the CPU and the one or more physical storage devices over the first set of lanes between the CPU and the first connector of the I/O slot, over the loop back path between the first connector and the second connector, and over the second set of lanes between the second connector and the one or more physical storage devices.

2. The system of claim 1, wherein the one or more physical storage devices do not have connectivity to the CPU when the I/O card is not inserted into the I/O slot.

3. The system of claim 1, wherein the one or more connections and the second set of lanes are provided, at least in part over a cable.

4. The system of claim 3, wherein the cable connects the second connector of the I/O slot to a cable connector of an interconnect module, wherein the cable connector of the interconnect module is configured to have connectivity to the one or more physical storage devices.

5. The system of claim 1, wherein the one or more connections and the second set of lanes are provided, at least in part, over one or more electrically conductive pathways of one or more printed circuit boards.

6. The system of claim 1, wherein the I/O card is an extended I/O card, the I/O slot is an extended I/O slot, and wherein the I/O slot is further configured to receive a second I/O card different from the I/O card, and
   wherein the second I/O card, when inserted into the I/O slot, is configured to use the first connector to have connectivity to the CPU over the first set of lanes, is not configured to use the second connector, and is not configured to have connectivity over the second set of one or more lanes between the I/O slot and the one or more physical storage devices.

7. The system of claim 6, wherein when the I/O card is inserted into the I/O slot, the I/O card is configured to use the first connector to provide connectivity with the CPU over the first set of one or more lanes.

8. The system of claim 6, wherein the I/O card includes one or more components configured to be connectively disposed between the first connector and the second connector of the I/O slot.

9. The system of claim 8, wherein the one or more components includes an intervening switch configured to be connectively disposed between the first connector and the second connector of the I/O slot.

10. The system of claim 9, wherein the intervening switch is configured to have connectivity to the CPU and to the one or more physical storage devices, wherein the intervening switch has connectivity to the one or more physical storage devices over the second connector and the one or more connections configured from the second set of lanes, and wherein the intervening switch has connectivity to the CPU over the first connector and the first set of lanes.

11. The system of claim 10, wherein the intervening switch is configured to route packets between the second set of lanes and the first set of lanes.

12. The system of claim 11, wherein X1 denotes a number of lanes in the first set of lanes, X2 denotes a number of lanes in the second set of lanes, and wherein X2 is more than X1.

13. The system of claim 8, wherein the one or more components include an intervening retimer configured to be connectively disposed between the first connector and the second connector of the I/O slot.

14. The system of claim 13, wherein the intervening retimer is configured to have connectivity to the CPU and to the one or more physical storage devices, wherein the intervening retimer has connectivity to the one or more physical storage devices over the second connector and the second one or more connections configured from the second set of lanes, and wherein the intervening retimer has connectivity to the CPU over the first connector and the first set of lanes.

15. The system of claim 14, wherein X1 denotes a number of lanes in the first set of lanes, X2 denotes a number of lanes in the second set of lanes, and wherein X2 is equal to X1.

16. A method for providing connectivity to one or more physical storage devices in a system comprising:
   providing connectivity between a central processing unit (CPU) and an I/O slot over a first set of lanes connecting the CPU and a first connector of the I/O slot;
   providing connectivity over a second set of lanes between a second connector of the I/O slot and the one or more physical storage devices;
   inserting an I/O card into the I/O slot whereby the I/O card has connectivity to the first connector and the second connector of the I/O slot;
   responsive to said inserting the I/O card into the I/O slot whereby the I/O card has connectivity to the first connector and the second connector of the I/O slot, performing processing including:
   providing, using the I/O card and the I/O slot, a loop back path between the first connector of the I/O slot and the second connector of the I/O slot; and
   providing, by the system, connectivity between the CPU and the one or more physical storage devices over the first set of lanes between the CPU and the first connector of the I/O slot, over the loop back path between the first connector and the second connector, and over the second set of lanes between the second connector and the one or more physical storage devices.

17. The method of claim 16, wherein the system is a data storage system including an enclosure, wherein the enclosure includes the CPU, the one or more physical storage devices, and a cable used to provide, at least in part, the second set of lanes between the second connector of the I/O slot and the one or more physical storage devices.

18. The method of claim 16, wherein the second set of lanes is configured into one or more connections, wherein each of the one or more connections includes one or more of the second set of lanes, and wherein each of the one or more connections is a connection to an associated one of the one or more physical storage devices.

* * * * *

UNITED STATES PATENT AND TRADEMARK OFFICE
CERTIFICATE OF CORRECTION

| | | |
|---|---|---|
| PATENT NO. | : 11,726,660 B1 | |
| APPLICATION NO. | : 17/721785 | |
| DATED | : August 15, 2023 | |
| INVENTOR(S) | : Hadav et al. | |

It is certified that error appears in the above-identified patent and that said Letters Patent is hereby corrected as shown below:

On the Title Page

Item (57), The abstract, Line 3 "two connectors of an extended PO slot" should read -- two connectors of an extended IO slot --

Signed and Sealed this
Nineteenth Day of September, 2023

Katherine Kelly Vidal
*Director of the United States Patent and Trademark Office*